United States Patent
Yoo

(10) Patent No.: US 10,656,895 B2
(45) Date of Patent: May 19, 2020

(54) SYSTEM FOR LINKING AND CONTROLLING TERMINALS AND USER TERMINAL USED IN THE SAME

(71) Applicant: INDUSTRY-UNIVERSITY COOPERATION FOUNDATION HANYANG UNIVERSITY, Seoul (KR)

(72) Inventor: Chang-sik Yoo, Seoul (KR)

(73) Assignee: INDUSTRY—UNIVERSITY COOPERATION FOUNDATION HANYANG UNIVERSITY, Seoul (KR)

( * ) Notice: Subject to any disclaimer, the term of this patent is extended or adjusted under 35 U.S.C. 154(b) by 0 days.

(21) Appl. No.: 16/142,998

(22) Filed: Sep. 26, 2018

(65) Prior Publication Data
US 2019/0026059 A1   Jan. 24, 2019

Related U.S. Application Data

(63) Continuation of application No. 13/785,600, filed on Mar. 5, 2013, now abandoned.

(30) Foreign Application Priority Data

Mar. 6, 2012   (KR) ........................ 10-2012-0022984
Mar. 6, 2012   (KR) ........................ 10-2012-0022986
(Continued)

(51) Int. Cl.
*G06F 3/045*   (2006.01)
*G06F 3/14*   (2006.01)
(Continued)

(52) U.S. Cl.
CPC ............ *G06F 3/1423* (2013.01); *G06F 3/038* (2013.01); *G06F 3/0412* (2013.01);
(Continued)

(58) Field of Classification Search
None
See application file for complete search history.

(56) References Cited

U.S. PATENT DOCUMENTS 4,903,012 A   2/1990   Ohuchi
5,420,379 A   5/1995   Zank
(Continued)

FOREIGN PATENT DOCUMENTS

JP   2003-333359 A   11/2003
JP   2009-129168 A   6/2009
(Continued)

OTHER PUBLICATIONS

Turn Off Cursor Pointer for Touch Use, Mar. 22, 2011, https://answers.microsoft.com/en-us/windows/forum/windows_vista-desktop/turn-off-cursor-pointer-for-touch-use/1bcc04a6-564c-4409-8a67-56cecdbb092e, p. 7 (Year: 2011).*
(Continued)

*Primary Examiner* — Lunyi Lao
*Assistant Examiner* — Kirk W Hermann

(57) ABSTRACT

A system for linking and controlling terminals is disclosed. A user terminal includes an image unit configured to output image data corresponding to a first image to be shared with a receiving terminal viewed by a user of the user terminal, and a signal unit configured to transmit the image data outputted from the image unit and position information of a touch input touching the user terminal to the receiving terminal. Here, the position information is position information of the touch input touching the user terminal at a preset pressure level or lower or with a preset contact area or smaller, and is displayed on the receiving terminal in an image form.

20 Claims, 23 Drawing Sheets

(30) Foreign Application Priority Data

| Mar. 6, 2012 | (KR) | 10-2012-0022988 |
|---|---|---|
| Mar. 6, 2012 | (KR) | 10-2012-0023012 |
| Mar. 8, 2012 | (KR) | 10-2012-0024073 |
| Mar. 8, 2012 | (KR) | 10-2012-0024092 |
| Mar. 30, 2012 | (KR) | 10-2012-0032982 |
| Mar. 30, 2012 | (KR) | 10-2012-0033047 |
| Apr. 25, 2012 | (KR) | 10-2012-0043148 |
| May 31, 2012 | (KR) | 10-2012-0057996 |
| May 31, 2012 | (KR) | 10-2012-0057998 |
| May 31, 2012 | (KR) | 10-2012-0058000 |

(51) Int. Cl.

| G06F 3/0488 | (2013.01) |
| H04N 21/422 | (2011.01) |
| G06F 3/038 | (2013.01) |
| H04N 5/44 | (2011.01) |
| G06F 9/451 | (2018.01) |
| G06F 3/041 | (2006.01) |
| G06F 3/16 | (2006.01) |

(52) U.S. Cl.
CPC ......... *G06F 3/0414* (2013.01); *G06F 3/0416* (2013.01); *G06F 3/0488* (2013.01); *G06F 3/16* (2013.01); *G06F 9/452* (2018.02); *H04N 5/4403* (2013.01); *H04N 21/4222* (2013.01); *H04N 21/42207* (2013.01); *H04N 21/42209* (2013.01); *H04N 21/42224* (2013.01); *G06F 2203/0384* (2013.01); *H04N 2005/441* (2013.01); *H04N 2005/443* (2013.01); *H04N 2005/4425* (2013.01)

(56) References Cited

U.S. PATENT DOCUMENTS

| 5,751,229 A | 5/1998 | Funahashi |
| 6,008,807 A | 12/1999 | Bretschneider et al. |
| 7,978,183 B2 | 7/2011 | Rosenberg et al. |
| 8,369,893 B2 | 2/2013 | Kirch et al. |
| 8,495,514 B1* | 7/2013 | Ludolph ............ G06F 3/0481 715/768 |
| 2002/0122029 A1 | 9/2002 | Murphy |
| 2002/0171689 A1 | 11/2002 | Fox et al. |
| 2002/0190920 A1 | 12/2002 | Kung |
| 2003/0025678 A1 | 2/2003 | Lee et al. |
| 2003/0182052 A1* | 9/2003 | DeLorme ............ G01C 21/26 701/533 |
| 2003/0222856 A1 | 12/2003 | Fedorak et al. |
| 2003/0231168 A1 | 12/2003 | Bell et al. |
| 2004/0104899 A1 | 6/2004 | Hong et al. |
| 2005/0062725 A1 | 3/2005 | Shih |
| 2005/0071761 A1 | 3/2005 | Kontio |
| 2005/0110769 A1 | 5/2005 | Dacosta |
| 2005/0156869 A1 | 7/2005 | Mori et al. |
| 2005/0190147 A1 | 9/2005 | Kim |
| 2005/0270756 A1* | 12/2005 | Kochis ............ H04W 88/02 361/760 |
| 2006/0103871 A1 | 5/2006 | Weinans |
| 2006/0132455 A1 | 6/2006 | Rimas-Ribikauskas et al. |
| 2006/0132456 A1 | 6/2006 | Anson |
| 2006/0135865 A1 | 6/2006 | Bharara et al. |
| 2006/0259942 A1 | 11/2006 | Toyama et al. |
| 2006/0265726 A1* | 11/2006 | Byun ............ H04H 40/18 725/40 |
| 2007/0024594 A1 | 2/2007 | Sakata et al. |
| 2007/0152976 A1 | 7/2007 | Townsend et al. |
| 2007/0262964 A1 | 11/2007 | Zotov et al. |
| 2007/0271525 A1 | 11/2007 | Han et al. |
| 2008/0013601 A1* | 1/2008 | Lind ............ H04M 1/6066 375/140 |
| 2008/0079757 A1* | 4/2008 | Hochmuth ............ G09G 5/003 345/698 |
| 2008/0115073 A1 | 5/2008 | Erickson et al. |
| 2008/0119235 A1* | 5/2008 | Nielsen ............ G06F 3/0483 455/566 |
| 2008/0122796 A1 | 5/2008 | Jobs et al. |
| 2008/0165154 A1 | 7/2008 | Kim |
| 2008/0204427 A1 | 8/2008 | Heesemans et al. |
| 2008/0273015 A1 | 11/2008 | Huang et al. |
| 2009/0058830 A1 | 3/2009 | Herz |
| 2009/0102972 A1 | 4/2009 | Kurita et al. |
| 2009/0106655 A1 | 4/2009 | Grant |
| 2009/0140978 A1 | 6/2009 | Louch |
| 2009/0167704 A1 | 7/2009 | Terlizzi |
| 2009/0225043 A1 | 9/2009 | Rosener |
| 2009/0251422 A1 | 10/2009 | Wu |
| 2009/0271834 A1* | 10/2009 | Asmussen ............ H04N 7/147 725/106 |
| 2009/0312065 A1* | 12/2009 | Wang ............ G06F 17/242 455/566 |
| 2009/0315848 A1 | 12/2009 | Ku et al. |
| 2010/0020043 A1* | 1/2010 | Park ............ G06F 3/0416 345/174 |
| 2010/0081476 A1 | 4/2010 | Markiewicz |
| 2010/0138780 A1 | 6/2010 | Marano et al. |
| 2010/0265189 A1 | 10/2010 | Rofougaran |
| 2010/0304674 A1* | 12/2010 | Kim ............ H04W 76/10 455/41.2 |
| 2011/0018695 A1 | 1/2011 | Bells et al. |
| 2011/0057896 A1 | 3/2011 | Baek |
| 2011/0181520 A1 | 7/2011 | Boda et al. |
| 2011/0267291 A1 | 11/2011 | Choi et al. |
| 2011/0279384 A1 | 11/2011 | Miller et al. |
| 2012/0038678 A1* | 2/2012 | Hwang ............ G06F 3/1454 345/667 |
| 2012/0040720 A1 | 2/2012 | Zhang et al. |
| 2012/0056825 A1 | 3/2012 | Ramsay et al. |
| 2012/0069772 A1 | 3/2012 | Byrne |
| 2012/0139865 A1 | 6/2012 | Krah et al. |
| 2012/0141342 A1 | 6/2012 | Alurralde et al. |
| 2012/0194440 A1 | 8/2012 | Ramrattan et al. |
| 2012/0218210 A1 | 8/2012 | Decaro |
| 2012/0262379 A1* | 10/2012 | King ............ G06F 3/1454 345/173 |
| 2012/0319972 A1 | 12/2012 | Tse et al. |
| 2013/0040623 A1* | 2/2013 | Chun ............ H04N 21/4126 455/414.2 |
| 2013/0179605 A1* | 7/2013 | Huang ............ H04L 65/4092 710/20 |
| 2013/0234959 A1 | 9/2013 | Yoo |
| 2013/0234984 A1 | 9/2013 | Yoo |
| 2013/0335333 A1 | 12/2013 | Kukulski et al. |

FOREIGN PATENT DOCUMENTS

| JP | 2012-043266 A | 3/2012 |
| KR | 10-2007-0012544 A | 1/2007 |
| KR | 10-2007-0107464 A | 11/2007 |
| KR | 10-2008-0096793 A | 11/2008 |
| KR | 10-2009-0102094 A | 9/2009 |
| KR | 10-2009-0117025 A | 11/2009 |
| KR | 10-2010-0015231 A | 2/2010 |
| KR | 10-2010-0023981 A | 3/2010 |
| KR | 10-2010-0028981 A | 3/2010 |
| KR | 10-2010-0064840 A | 6/2010 |
| KR | 10-2010-0095951 A | 9/2010 |
| KR | 10-2010-0120767 A | 11/2010 |
| KR | 10-2011-0027117 A | 3/2011 |
| KR | 10-2011-0032210 A | 3/2011 |
| KR | 10-2011-0037024 A | 4/2011 |
| KR | 10-2011-0057930 A | 6/2011 |
| KR | 10-2011-0067559 A | 6/2011 |
| KR | 10-2011-0069984 A | 6/2011 |
| KR | 10-2011-0100121 A | 9/2011 |
| KR | 10-2011-0119464 A | 11/2011 |

(56) References Cited

FOREIGN PATENT DOCUMENTS

KR     10-2011-0132507 A     12/2011
WO     WO 92/08206 A2     5/1992

OTHER PUBLICATIONS

Manar Mohaisen et al., "Adaptive Parallel and Iterative QRDM Algorithms for Spatial Multiplexing MIMO Systems", Vehicular Technology Conference Fall, Sep. 20-23, 2009, IEEE.
International Search Report for PCT/KR2008/007329 filed on Dec. 11, 2008.
Non-final Office Action for U.S. Appl. No. 13/785,498, dated Jan. 16, 2014.
Final Office Action for U.S. Appl. No. 13/785,498, dated Apr. 25, 2014.
Notice of Allowance for U.S. Appl. No. 13/785,498, dated Aug. 4, 2014.
Non-final Office Action for U.S. Appl. No. 13/785,302, dated Mar. 28, 2014.
Non-final Office Action for U.S. Appl. No. 13/785,266, dated Jan. 16, 2014.
Final Office Action for U.S. Appl. No. 13/785,600, dated Mar. 26, 2014.
Non-final Office Action for U.S. Appl. No. 13/785,600, dated Nov. 29, 2013.

* cited by examiner

SYSTEM FOR LINKING AND CONTROLLING TERMINALS AND USER TERMINAL USED IN THE SAME

CROSS-REFERENCES

The present application is a continuation of U.S. patent application Ser. No. 13/785,600 filed on Mar. 5, 2013, which claims the priority of Korean Patent Application No. 10-2012-0058000 filed on May 31, 2012, Korean Patent Application No. 10-2012-0057998 filed on May 31, 2012, Korean Patent Application No. 10-2012-0057996 filed on May 31, 2012, Korean Patent Application No. 10-2012-0043148 filed on Apr. 25, 2012, Korean Patent Application No. 10-2012-0033047 filed on Mar. 30, 2012, Korean Patent Application No. 10-2012-0032982 filed on Mar. 30, 2012, Korean Patent Application No. 10-2012-0024092 filed on Mar. 8, 2012, Korean Patent Application No. 10-2012-0024073 filed on Mar. 8, 2012, Korean Patent Application No. 10-2012-0022984 filed on Mar. 6, 2012, Korean Patent Application No. 10-2012-0022988 filed on Mar. 6, 2012, Korean Patent Application No. 10-2012-0022986 filed on Mar. 6, 2012, and Korean Patent Application No. 10-2012-0023012 filed on Mar. 6, 2012, the disclosures of which are hereby incorporated in their entirety by reference.

BACKGROUND

Description of the Related Art

Recently, people have greatly increased the use of electronic terminals such as smart phones, etc., to play games, check e-mail, or surf the web. Although an electronic terminal has the advantage of convenient portability due to its light weight and small size, it generally has a small screen, which does not allow the user to fully enjoy the game, etc. That is, the small size of the electronic terminal may diminish the enjoyment of content such as games, web surfing, etc., and may make it inconvenient to check e-mail, etc.

SUMMARY

Embodiments include a method and system for linking a receiving terminal with a user terminal and controlling the user terminal while viewing the receiving terminal. For example, the receiving terminal may be larger than the user terminal.

An embodiment includes user terminal comprising: a display unit; and a signal unit configured to transmit position information of a touch means to a receiving terminal, the position information indicating information according to a touch pressure or a touch area of the touch means touching the user terminal. Here, an image corresponding to the position information of the touch means when the touch means is positioned over an event-executing object displayed on the display unit is different from an image corresponding to the position information of the touch means when the touch means is not positioned over the event-executing object.

An embodiment includes a user terminal comprising: a display unit; a signal unit configured to transmit position information of a touch means to a receiving terminal, the position information indicating information according to a touch pressure or a touch area of the touch means touching the user terminal; and a mode changer unit configured to change a touch mode according to a user's input. The touch mode comprises a first touch mode for recognizing a touch of the touch means regardless of the touch pressure or touch area of the touch means; and a second touch mode for recognizing the touch pressure or touch area of the touch means. Here, the signal unit transmits the position information of the touch means to the receiving terminal in the second touch mode.

An embodiment includes a method of linking terminals, the method comprising: outputting image data to be shared by a user terminal and a receiving terminal; and providing position information of a touch means to the receiving terminal, the position information indicating information according to a touch pressure or a touch area of the touch means touching the user terminal. Here, an image corresponding to the position information of the touch means when the touch means is positioned over an event-executing object displayed on a display unit of the user terminal is different from an image corresponding to the position information of the touch means when the touch means is not positioned over the event-executing object.

An embodiment includes a method of linking terminals, the method comprising: outputting image data to be shared by a user terminal and a receiving terminal; providing position information of a touch means to the receiving terminal, the position information indicating information according to a touch pressure or a touch area of the touch means touching the user terminal; and changing a touch mode according to a user's input. The touch mode includes: a first touch mode for recognizing a touch of the touch means regardless of the touch pressure or touch area of the touch means; and a second touch mode for recognizing the touch pressure or touch area of the touch means. Here, the user terminal transmits the position information of the touch means to the receiving terminal in the second touch mode.

An embodiment includes a recorded medium readable by a digital processing device, tangibly embodying a program of instructions executable by the digital processing device to link a user terminal and a receiving terminal, the program of instructions configured to perform a method comprising: generating image data; and providing position information of a touch means to the receiving terminal, the position information indicating information according to a touch pressure or a touch area of the touch means touching the user terminal. Here, an image corresponding to the position information of the touch means when the touch means is positioned over an event-executing object displayed on a display unit of the user terminal is different from an image corresponding to the position information of the touch means when the touch means is not positioned over the event-executing object.

An embodiment includes a recorded medium readable by a digital processing device, tangibly embodying a program of instructions executable by the digital processing device to link a user terminal and a receiving terminal, the program of instructions configured to perform a method comprising: generating image data; providing position information of a touch means to the receiving terminal, the position information indicating information according to a touch pressure or a touch area of the touch means touching the user terminal; and changing a touch mode according to a user's input. The touch mode comprises: a first touch mode for recognizing a touch of the touch means regardless of the touch pressure or touch area of the touch means; and a second touch mode for recognizing the touch pressure or touch area of the touch means. Here, the user terminal transmits the position information of the touch means to the receiving terminal in the second touch mode.

With the method and system for linking and controlling terminals according to certain embodiments, a first image is shared between the terminals, and a second image, associated with the user's control operations on the smaller terminal, is displayed over the first image on the larger terminal, allowing the user to control the operations on the smaller terminal while viewing the larger terminal. Thus, the user can better enjoy games, web surfing, etc., using the smaller terminal.

Also, the user terminal can display the position of the touch means, to thereby reduce errors when making selections by the touch method even when using an obtuse touch means such as a finger.

Additional aspects and advantages of the present invention will be set forth in part in the description which follows, and in part will be obvious from the description, or may be learned by practice of the invention.

DETAILED DESCRIPTION

Certain embodiments of the present invention will be described below in more detail with reference to the accompanying drawings.

A system for linking and controlling terminals according to an embodiment relates to linking and controlling terminals, especially by sharing an image and controlling the operation of a terminal based on the shared image. In particular, a system for linking and controlling terminals according to an embodiment can link a smaller terminal (e.g. smart phone, tablet PC, etc.), which is controlled by a touch method, with a larger terminal (e.g. TV, etc.) and enable various methods that allow a user to control the smaller terminal while viewing the larger terminal.

For the sake of convenience, the smaller terminal controlled directly by the user will be referred to as the user terminal or a mobile terminal, and the larger terminal that receives the position information of the touch means from the user terminal will be referred to as the receiving terminal or a display device. Although the user terminal may preferably have a smaller size compared to the receiving terminal, the sizes of the terminals are not thus limited.

The terminals used in a system according to an embodiment may be provided with a function for display images and a function for wired/wireless communication, but the communication function is not essential to the invention. Considering real-life applications, however, it may be preferable if each of the terminals is equipped with an image display function and a communication function. The terminal is not limited to a particular type of device, as long as it is capable of displaying images and exchanging signals with the another terminal, and various devices, for example such as a smart phone, smart TV, PC, tablet PC, laptop, touch pad, game console, cloud PC, etc., can be used as the terminal in an embodiment. However, it may be preferable if the smaller terminal is equipped with a touch function.

A system for linking and controlling terminals according to various embodiments will be described below in detail with reference to the accompanying drawings. For convenience, the image shared by the terminals will be referred to as the first image, and the image representing the position information of the touch means will be referred to as the second image (position indicator image).

FIGS. 1A through 1D schematically illustrate a system for linking and controlling terminals according to an embodiment.

Figure 1A:
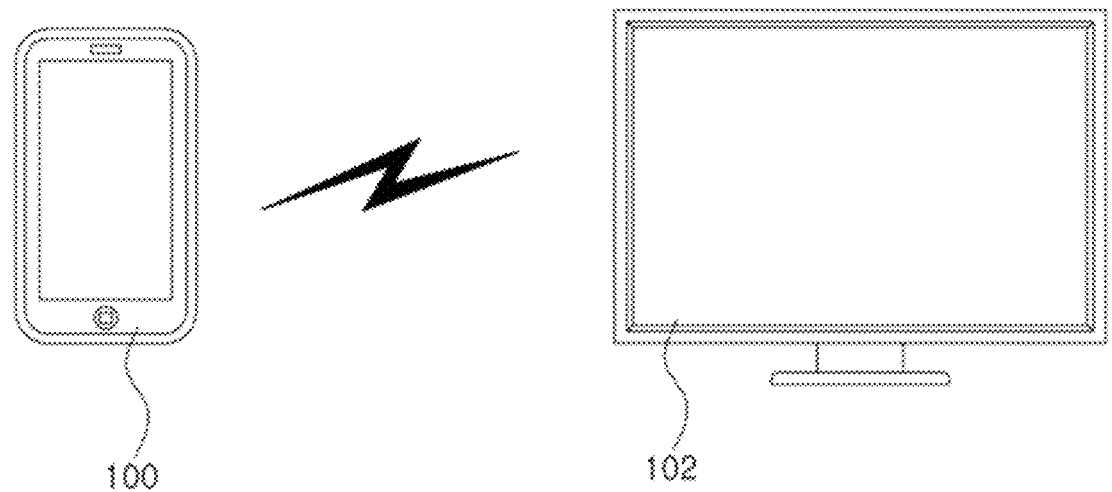
FIG. 1A, FIG. 1B, FIG. 1C, and FIG. 1D schematically illustrate a system for linking and controlling terminals according to an embodiment.

Referring to FIG. 1A, a system for linking and controlling terminals according to this embodiment can include a user terminal 100 and a receiving terminal 102, where the terminals 100 and 102 can be computing apparatuses.

The user terminal 100 may be a display-enabled terminal that is directly controlled by the user, for example the user terminal may be a smart phone or the like capable of running a game or other media, for example a racing game, etc. Also, the user terminal 100 can be a terminal having a relatively small size and having a touch function, for example, the user terminal 100 can be a mobile terminal.

The receiving terminal 102 may be a terminal that is not directly manipulated by the user but is linked with the user terminal 100, and can be a display-enabled terminal. That is, the receiving terminal 102 may be any device capable of displaying an image or content, and from the perspective of displaying an image, can also be referred to as a display device. The receiving terminal 102 can be a device used for a different purpose from that of the user terminal 100, and for example the receiving terminal 102 can be a TV for showing broadcast programs such as a drama series. In an embodiment, the receiving terminal 102 may be a terminal having a relatively larger size, although it may not necessarily have a touch function.

The overall size of the receiving terminal 102 can be larger than the overall size of the user terminal 100, but considering that the user terminal 100 is to be controlled by way of the receiving terminal 102, it may be sufficient if the size of the display unit on the receiving terminal 102 is larger than the size of the display unit on the user terminal 100. In the latter case, the overall sizes of the user terminal 100 and receiving terminal 102 need not be considered.

The terminals 100 and 102 can be connected directly in a wired or wireless manner or indirectly using another device as a medium. In one embodiment, the user can control the user terminal 100 while viewing the receiving terminal 102, and therefore, the receiving terminal 102 can be positioned at a distance that permits viewing by the user of the user terminal 100. In this case, the user terminal 100 and the receiving terminal 102 can be connected using near-field wireless communication.

Figure 1B:
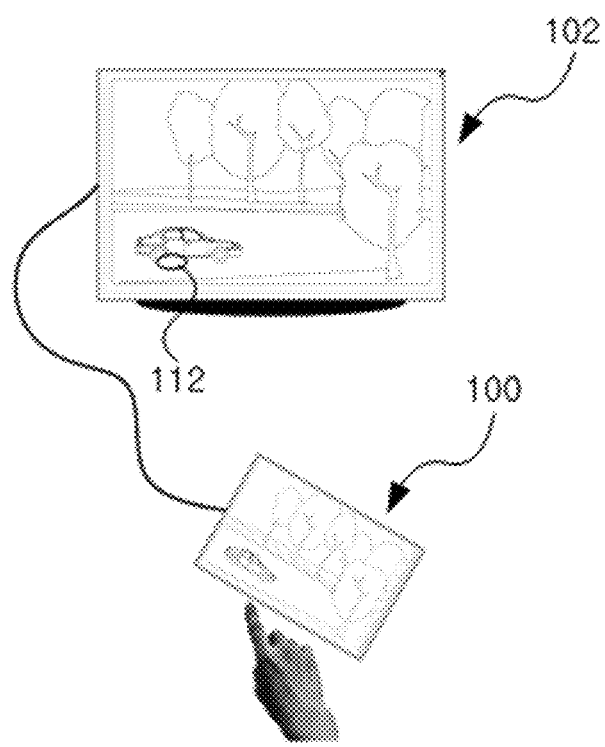

When the user terminal 100 transmits image data corresponding to the first image 110 displayed by the user terminal to the receiving terminal 102, the receiving terminal 102 may display the first image 110 corresponding to the image data, as illustrated in FIG. 1B. Consequently, the user terminal 100 and the receiving terminal 102 can display substantially the same first image 110, i.e. share the first image 110.

Of course, although the first image 110 displayed on the receiving terminal 102 is substantially the same as the first image 110 displayed on the user terminal 100, the contrast or display proportion, etc., may differ according to the properties of the receiving terminal 102. The receiving terminal 102 can display the first image 110 as is, without particularly modifying the transmitted image data, or the receiving terminal 102 can convert the resolution, etc., of the transmitted image data and then display the first image 110 corresponding to the converted image data.

According to an embodiment, another device connected with the receiving terminal 102 can suitably convert the image data transmitted from the user terminal 100 and then transmit the converted image data to the receiving terminal 102.

That is, as long as the receiving terminal 102 and the user terminal 100 display substantially the same first image 110, the method of processing the image data at the receiving terminal 102 can be modified in various ways.

The user terminal 100 can also convert the image data corresponding to the first image 110, in consideration of the resolution, etc., of the receiving terminal 102, such that the image data is suitable for the receiving terminal 102, and then transmit the converted image data to the receiving terminal 102.

When the receiving terminal 102 displays the first image 110, the receiving terminal 102 can stop the previously running program and display the first image 110, or alternatively continue running the previous program and display the first image 110 through a separate channel. The receiving terminal 102 can also display the first image 110 together with the previously run program simultaneously. For example, the receiving terminal 102 can superimpose the first image 110 of a game over a drama series showing on the current channel.

The first image 110 can change with time, and the user terminal 100 can transmit image data corresponding to the changed first image 110 to the receiving terminal 102. Consequently, the user terminal 100 and the receiving terminal 102 can continuously share the first image 110. For example, the first image 110 may change continuously as the user plays the game on the user terminal 100, and the user terminal 100 can transmit to the receiving terminal 102 the image data for the changed first image 110 whenever the first image 110 is changed.

Thus, when the user manipulates the user terminal 100, a first image 110 corresponding to the manipulation may be displayed on the receiving terminal 102. In particular, as the position information of a touch means (described later on) is indicated on the receiving terminal 102, which has a larger size than the user terminal 100, the user can control the user terminal 100 while viewing the receiving terminal 102.

A description will now be provided of various embodiments that allow a user to control the operation of the user terminal 100 without looking at the screen of the user terminal 100 but by looking at the receiving terminal 102.

Figure 1C:
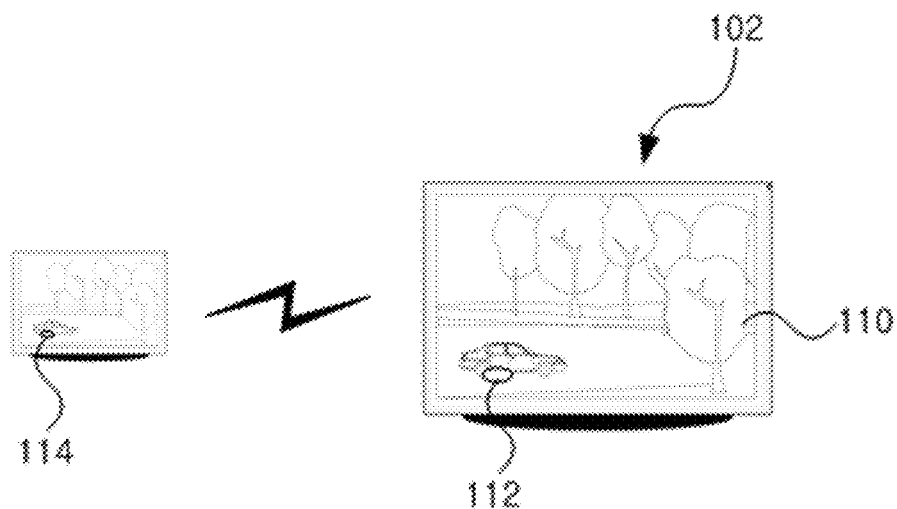
Figure 1D:
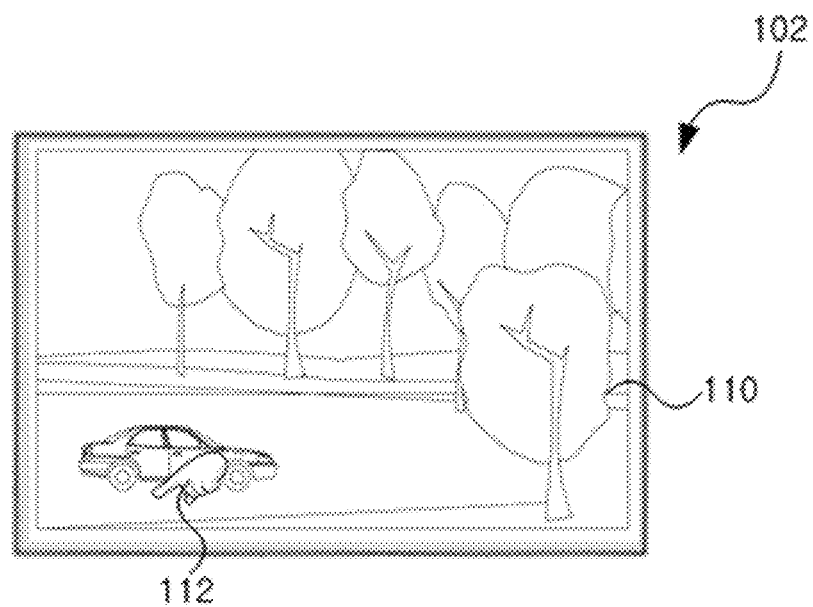

According to an embodiment, when a touch means, such as the user's finger, a touch pen, etc., is brought near to a touch-sensitive region of the user terminal 100, such as the display unit, then a second image 112 such as a pointer, a shadow image, etc., corresponding to the position information of the touch means can be displayed on the receiving terminal 102 together with the first image 110, as illustrated in FIGS. 1B through 1D. That is, the linkage and control system of an embodiment can link the user terminal 100 with the receiving terminal 102 and indicate on the receiving terminal 102 the position of the touch means that is near the user terminal 100. Here, being near may refer to the touch means being positioned with a preset distance from the user terminal 100, including the case of the touch means contacting the user terminal 100.

In an embodiment, the position information of the touch means can be shown differently on the receiving terminal 102 according to the touch pressure or the touch area of the touch means touching the user terminal 100. For example, if the touch means touches the user terminal 100 with a touch pressure or a touch area smaller than or equal to a preset value, then the position information of the touch means may be indicated on the receiving terminal 102, whereas if the touch pressure or touch area is greater than or equal to a preset value, then the position information of the touch means may not be displayed on the receiving terminal 102 or may be displayed on the receiving terminal 102 as an image different from the image of the position information for a touch pressure or touch area smaller than or equal to the preset value. That is, the position information of the touch means can be displayed on the receiving terminal 102 if the touch means touches the user terminal 100 with a light pressure.

In another embodiment, the receiving terminal 102 can display the second image 112 as illustrated in FIG. 1B when the touch means is near the user terminal 100, and can display the second image 112b in another shape as illustrated in FIG. 1D when the touch means touches the user terminal 100.

In different embodiments, at least one of the position of the touch means near the user terminal 100, the position of the touch means touching the user terminal 100 with a touch pressure smaller than or equal to a preset value, and the position of the touch means touching the user terminal 100 with a touch area smaller than or equal to a preset value can be indicated on the receiving terminal 102.

The first image 110 can also be shared by having the receiving terminal 102 transmit the image data to the user terminal 100. Of course, the user terminal 100 can transmit the position information of the touch means to the receiving terminal 102. That is, as long as the first image 110 is shared by the terminals 100 and 102, there is no limit to how the image is shared, and the user terminal 100 can transmit the position information of the touch means to the receiving terminal 102 while the image is being shared.

In short, the user can perceive the user's own actions for controlling the user terminal 100 through the second image 112 indicated on the receiving terminal 102, without looking at the user terminal 100. Thus, the user can easily control the user terminal 100 by viewing only the receiving terminal 102. For example, when the user is playing the game on a smart phone, the user can enjoy the game by manipulating the smart phone while viewing a larger TV screen.

Also, when the first image 110 displayed on the user terminal 100 is altered to another first image 110 in accordance with the user's manipulation, the same first image 110 can be displayed on the receiving terminal 102 as well, and the second image 112 can be displayed together with the altered first image 110. Thus, the user can freely move the touch means on the user terminal 100 while viewing the receiving terminal 102, and the movement of the touch means may be reflected immediately at the receiving terminal 102.

Although the descriptions above refer to the user terminal 100 as transmitting the image data for the first image 110 and the position information of the touch means separately to the receiving terminal 102, the user terminal 100 can just as well indicate the position of the touch means in the first image 110 and transmit the first image 110, in which the position of the touch means is indicated, to the receiving terminal 102. For example, the user terminal 100 may superimpose the position image for the touch means over the first image 110 and transmit the image data, with the position image of the touch means superimposed, to the receiving terminal 102.

In another example, the user terminal 100 can modify a region corresponding to the position of the touch means in the first image 110 to a position image for the touch means. That is, the user terminal 100 can modify the first image 110 itself and create a new image to indicate the position of the touch means, and can transmit the created image to the receiving terminal 102.

According to an embodiment, the second image 112 can be displayed on the user terminal 100 or on the receiving terminal 102 according to the user's request. For example, if the user does not wish to show the second image 112 during linked operation, the user can select a menu item or input a button manipulation, etc., on the user terminal 100 or on the receiving terminal 102 to stop showing the second image 112. In this case, the user terminal 100 can continuously transmit the position information of the touch means to the receiving terminal 102 and the receiving terminal 102 can store the transmitted position information, so that the receiving terminal 102 may display the second image 112 corresponding to the position information upon the user's request.

According to an embodiment, the user can employ a user terminal 100 equipped with a touch-sensing unit, such as a touch pad, for example, that is separate from the display unit, where the user terminal 100 can transmit to the receiving terminal 102 the position information of a touch means near the touch-sensing unit. That is, as long as the user terminal 100 is capable of sensing the touch means, the touch means and the region sensitive to the touch means are not limited to particular regions or means.

Although the descriptions above refer to a linkage between one user terminal 100 and one receiving terminal 102, it is possible to connect multiple user terminals 100 to a single receiving terminal 102. For example, if many users are playing the same game, then the user terminals 100 can each be connected with the receiving terminal 102. As the user terminals 100 each transmit the position information of the corresponding touch means to the receiving terminal 102, the receiving terminal 102 can display the first image 110 together with one or more second images showing the positions of the touch means. In this case, the first image 110 shared by the user terminals 100 and the receiving terminal 102 can be transmitted to the receiving terminal 102 from a particular user terminal 100. The second images can have different shapes, colors, or sizes for distinction.

According to an embodiment, the linkage and control system can include a user terminal, a receiving terminal, and a linkage server. The linkage server can transmit image data corresponding to the first image 110 to the user terminal and the receiving terminal, and the user terminal can transmit the position information of the touch means to the receiving terminal, so that the second image 112 indicating the position information of the touch means may be shown together with the first image 110 at the receiving terminal. Here, the linkage server can pre-store the resolution information, etc., of the user terminal and the receiving terminal to process the image data based on the stored resolution information, etc., before transmitting it to the user terminal and the receiving terminal.

According to an embodiment, the second image indicating the position information of the touch means can be shown not only on the receiving terminal 102 as second image 112 but also on the user terminal 100 as second image 114, as illustrated in FIG. 1C. The second image 114 shown on the user terminal 100 can be substantially the same as the second image 112 shown on the receiving terminal 102 or can have a different shape, size, or color.

Although it was not mentioned above, the terminals 100 and 102 can be connected via multiple channels, such as two channels, for example. One channel can be used for transmitting the image data (image information) corresponding to the first image 110 shared by the terminals 100 and 102, while another channel can be used for transmitting a control signal that includes the position information of the touch means. The channels can both be wireless channels or wired channels, or alternatively one can be a wireless channel and the other can be a wired channel. Also, the control signal may include various control signals related to operations between the terminals 100 and 102, such as a control signal including the position information of the touch means, a control signal related to linked operation, etc. It should be understood that the terminals 100 and 102 can also exchange the image data and the position information of the touch means through one channel.

Recently, terminals such as smart phones, TVs, etc., use wired communication standards such as High-Definition Multimedia Interface (HDMI), Mobile High-definition Link (MHL), Displayport, etc., and wireless communication standards such as Digital Living Network Alliance (DNLA) and WiFi, etc., and are each provided not only with data channels for transmitting data but also with a separate channel for exchanging control signals. For example, HDMI uses Consumer Electronic Control (CEC), Display Data Channel (DDC), Utility, and SCUSDA as control channels; MHL uses CBUS as a control channel; and Displayport uses an auxiliary channel as a control channel. Thus, it may not be necessary to establish separate channels for linking the terminals 100 and 102, and the channels already available on the terminals 100 and 102 can be utilized for a channel by which to transmit the position information of the touch means according to an embodiment.

The terminals 100 and 102 can exchange data in various forms according to the communication method used for the linkage system.

A description will now be provided of a method for specifying the touch position of the touch means at the receiving terminal 102.

In an embodiment, the position information of the touch means can be the position information on the first image 110 displayed on the user terminal 100. Consequently, the position of the touch means on the first image 110 of the user terminal 100 can be reflected in the first image 110 of the receiving terminal 102 as the second image 112.

In an embodiment, the position information of the touch means can be coordinate information that is in accordance with the resolution or screen size of the display unit of the user terminal 100. That is, the position information of the touch means can be the coordinate information of the touch means with respect to the display unit of the user terminal 100, rather than the coordinate information of the touch means on the image displayed on the screen.

For example, considering a case in which a map is displayed on the user terminal 100 and a touch means is brought near a particular point on the map, the position information of the touch means can be coordinates with respect to the screen of the user terminal 100, rather than coordinates with respect to the map. When the user terminal 100 transmits the position information of the touch means to the receiving terminal 102, the receiving terminal 102 can compare its resolution or screen size with the resolution or screen size of the user terminal 100 and show the second image 112 at the coordinates corresponding to the position information of the touch means in accordance with the comparison result. Here, the comparison result can be determined at the time of linking and pre-stored in the receiving terminal 102. Thus, the receiving terminal 102 can determine the coordinates based on the pre-stored comparison results when the position information is transmitted and display the second image 112 at the position corresponding to the coordinates determined.

In an embodiment, the receiving terminal 102 can display the first image 110 corresponding to the image data after setting the screen to the same resolution as the user terminal 100 when the receiving terminal 102 is to show the image data transmitted from the user terminal 100 so that the user terminal 100 and the receiving terminal 102 may share the first image 110. Thus, the receiving terminal 102 can accurately represent the position of the touch means by displaying the second image 112 with the position information, e.g. the coordinate information, of the touch means unmodified.

That is, embodiments include various methods for specifying the position of the touch means at the receiving terminal 102. The user terminal 100 can transmit the position information of the touch means to the receiving terminal 102, or generate second image data corresponding to the second image 112 representing the position information and send this second image data to the receiving terminal 102, or transmit the first image 110 to the receiving terminal 102 with the region corresponding to the position of the touch means modified.

A method for linking and controlling terminals according to various embodiments will be described below in more detail with reference to the accompanying drawings.

Figure 2:
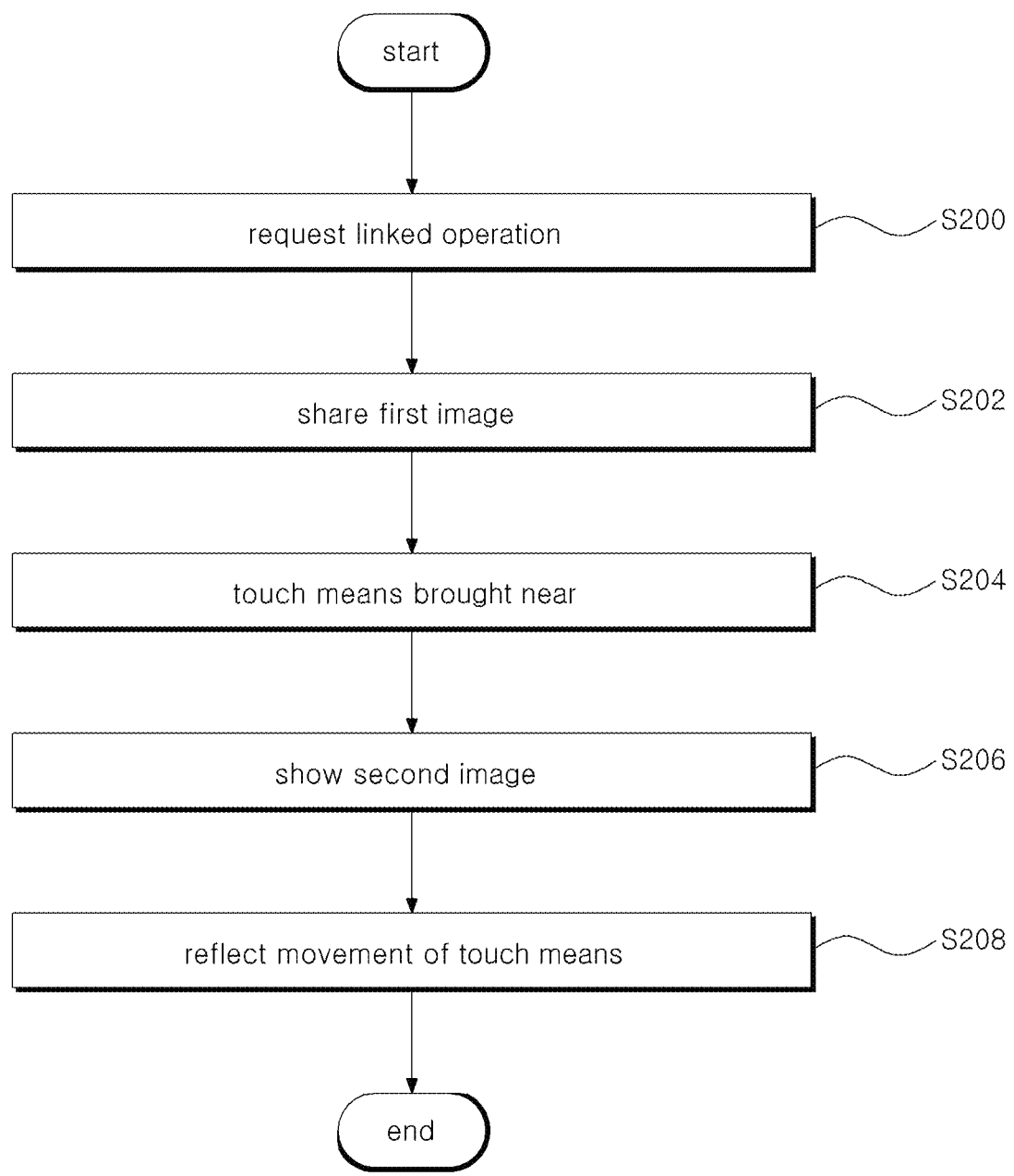
FIG. 2 is a flowchart illustrating a method of linking and controlling terminals according to an embodiment.
Figure 3:
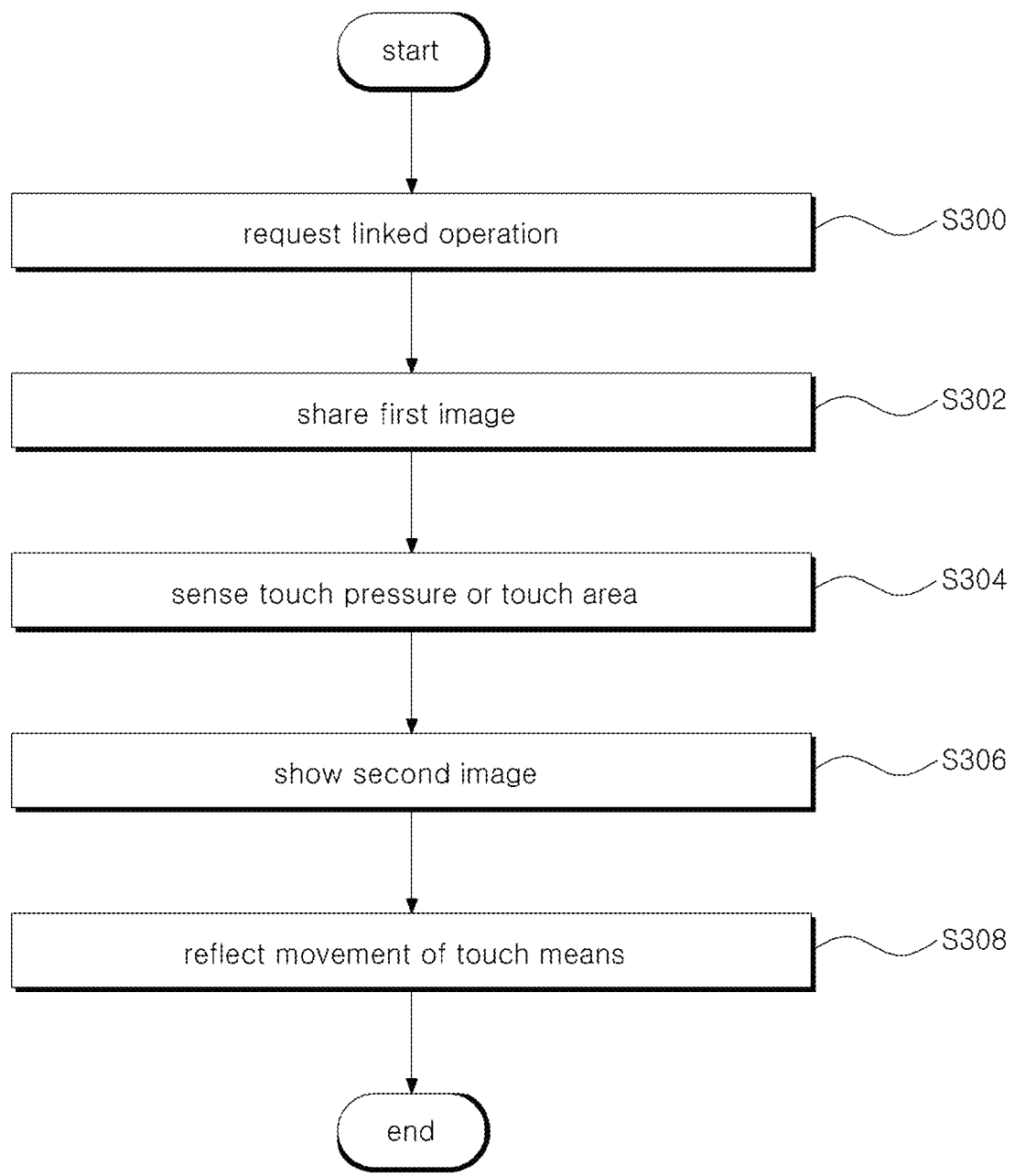
FIG. 3 is a flowchart illustrating a method of linking and controlling terminals according to an embodiment.
Figure 4A:
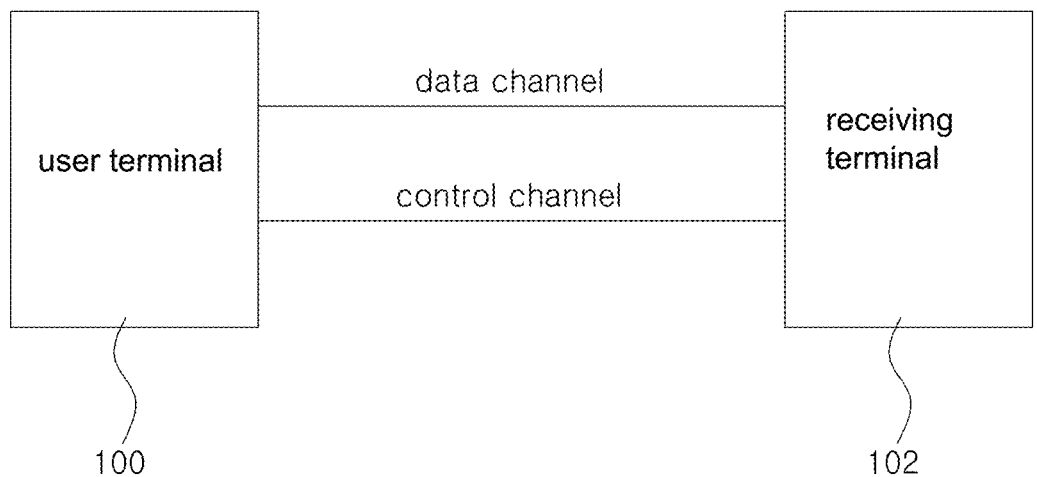
FIG. 4A, FIG. 4B, and FIG. 4C illustrate a control method that can be used in the methods of linking and controlling terminals shown in FIG. 2 and FIG. 3.
Figure 4B:
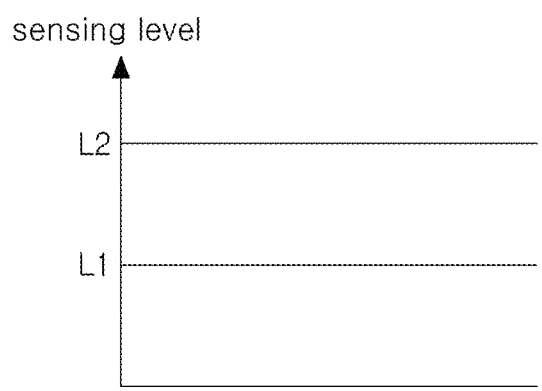
Figure 4C:
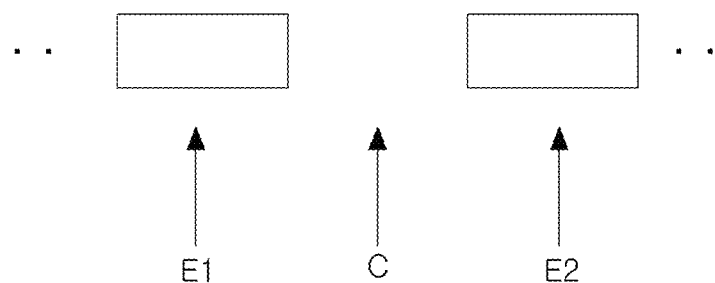

FIG. 2 is a flowchart illustrating a method of linking and controlling terminals according to an embodiment. FIG. 3 is a flowchart illustrating a method of linking and controlling terminals according to an embodiment. FIGS. 4A through 4C illustrate a control method that can be used in the methods of linking and controlling terminals illustrated in FIG. 2 and FIG. 3. FIGS. 5A through 5E illustrate a linkage operation when sensing levels are set in accordance with an embodiment. FIG. 6A and FIG. 6B illustrate a method of showing a second image 112 according to an embodiment.

Referring to FIG. 2, an embodiment includes a linkage and control method for a setup in which a user terminal 100 transmits image data to a receiving terminal 102.

Referring to FIG. 2, the user terminal 100 may request the receiving terminal 102 for a linkage of images (S200). To be more specific, if the user terminal 100 or the receiving terminal 102 requests linkage to the counterpart terminal after the user terminal 100 and the receiving terminal 102 connected by the user for linked operation, or if the user terminal 100 requests linkage to the receiving terminal 102 and the linkage is accepted, a channel can be formed between the terminals 100 and 102 capable of transmitting the position information of a touch means. Here, the linkage of the terminals 100 and 102 can be performed according to a user's request or can be performed automatically by a terminal 100 or 102.

According to an embodiment, the user terminal 100 and the receiving terminal 102 can be connected by two channels, i.e. a data channel and a control channel, as illustrated in FIG. 4A, and the control signal for requesting or accepting linkage can be exchanged through the control channel.

According to an embodiment, the data can be exchanged through one channel. For example, the transmission periods for the channel can include data periods E1 and E2 for transmitting image data, and a control period C between the data periods E1 and E2 for transmitting the position information, as illustrated in FIG. 4C. In particular, the position information can be transmitted by utilizing the blank periods C in-between the periods for transmitting image data. For example, the user terminal 100 can transmit the image data to the receiving terminal 102 through one channel, and can transmit the position information to the receiving terminal 102 during the blank periods C existing in-between the data periods E1 and E2 for transmitting image data.

Next, the user terminal 100 may transmit image data corresponding to a first image 110 to the receiving terminal 102, and the receiving terminal 102 may display the first image 110 corresponding to the transmitted image data (S202). That is, the user terminal 100 and the receiving terminal 102 may share the first image 110.

Then, as the user brings the touch means near to the user terminal 100, the user terminal 100 may sense the touch means (S204). More specifically, the user terminal 100 may sense the touch means if the touch means enters a region that permits sensing. For example, the user terminal 100 can use a capacitance-based touch panel, and when the user brings a touch means such as a finger near the user terminal 100, can sense the position of the finger by sensing the change in capacitance caused by the finger.

In performing such sensing, the user terminal 100 can set multiple levels, e.g. two levels, for the sensing levels, as illustrated in FIG. 4B. If it is not performing a terminal-linked process, i.e. if the user is using only the user terminal 100, the sensing level for the user terminal 100 can be set to a higher level (L2) such that the touch position is sensed only when there is a touch by the user.

Conversely, if the user is performing a terminal-linked process, i.e. if the receiving terminal 102 is also being used, the user terminal 100 may set the sensing level to a lower level (L1). Thus, the user terminal 100 can sense the touch means even when the touch means is near and not touching. In other embodiments, the user terminal 100 can employ various methods other than the capacitance-based method, such as methods based on electromagnetic induction, methods using a resistive overlay, optical methods, ultrasonic methods, etc., and the settings conditions can vary according to the method employed.

Next, the user terminal 100 may transmit the position information of the touch means obtained according to the sensing result to the receiving terminal 102, and the receiving terminal 102 may display a second image 112 representing the position information, for example a position indicator image (second image 112) such as that illustrated in FIG. 1B, together with the first image 110 (S206).

Here, the position information of the touch means can be information in an image form or information in a coordinate form. That is, the user terminal 100 can generate the position information for the second image 112 directly in the form of image data and transmit it to the receiving terminal 102, or transmit only the position information of the touch means to the receiving terminal 102 in the form of a control signal. Alternatively, the user terminal 100 can generate a position image (second image 112) for the touch means and transmit image data with the first image 110 and the second image 112 included to the receiving terminal 102, so that the second image 112 can be displayed on the receiving terminal 102 concurrently with the sharing of the first image 110.

When the touch means is moved near to the user terminal 100, the second image 112 may reflect the movement of the touch means, so that the second image 112 may be displayed on receiving terminal 102 while moving continuously (S208).

When the user touches an icon in the first image 110 on the user terminal 100, only the first image 110 is changed and the position of the touch means remains the same, and thus at the receiving terminal 102, the display may have only the first image 110 changed, with the second image 112 maintaining its previous form. Alternatively, the second image 112 may not be displayed.

In short, a method for linking and controlling terminals according to an embodiment can involve sensing a touch means when the touch means is brought near the user terminal 100 while a first image 110 is being shared, and displaying a second image 112 indicating the position of the touch means together with the first image 110 of the receiving terminal 102.

The first image 110 and the second image 112 displayed on the receiving terminal 102 can be superimposed as separate images, or the first image 110 and the second image 112 can be combined to display the generated combined image on the receiving terminal 102.

Although the descriptions above refer to the second image 112 being shown over the first image 110, the method for showing the second image 112 can vary as long as it is displayed together with the first image 110. For example, a portion corresponding to the position of the touch means in the first image 110 can be represented in a darker shade, and the darkened portion can be the second image 112. That is, a region in the first image 110 corresponding to the position of the touch means can be modified to show the position of the touch means on the receiving terminal 102.

In contrast to FIG. 2, FIG. 3 depicts a method where the position of the touch means is displayed on the receiving terminal 102 in accordance with the touch pressure or touch area of the touch means touching the user terminal 100.

After the linkage request (S300) and the sharing of the first image 110 (S302), the user terminal 100 may sense the touch pressure or touch area of the touch means (S304). The user terminal 100 may transmit the position information of the touch means obtained according to the sensing result to the receiving terminal 102, and the receiving terminal 102 may display a second image 112 representing the position information, such as a position indicator image (second image 112) indicating the position of the touch means as illustrated in FIG. 1B, for example, together with the first image 110 (S306).

For example, the position of the touch means can be displayed on the receiving terminal 102 when the touch pressure of the touch means is smaller than or equal to a preset value or when the touch area is smaller than or equal to a preset value. That is, when the touch means touches the user terminal 100 lightly, the second image 112 can be displayed on the receiving terminal 102. When the touch means moves while touching the user terminal 100 lightly, the second image 112 may reflect the movement of the touch means, and the second image 112 may be displayed on the receiving terminal 102 as also moving continuously (S308).

According to an embodiment, when the touch means touches the user terminal 100 lightly, the user terminal 100 may not recognize the touch of the touch means as a touch input. That is, the user terminal 100, according to an embodiment, may recognize a touch input according to the touch pressure or touch area of the touch means. When the touch means touches the user terminal 100 with a strong pressure, i.e. if the touch pressure exceeds a preset pressure or the touch area exceeds a preset touch area, the user terminal 100 may recognize the touch of the touch means as a touch input. Thus, when the touch means is positioned over an icon while touching the user terminal 100 lightly, the program corresponding to the icon may not be executed, but when the touch means touches the icon strongly, the program corresponding to the icon can be executed.

As described above, the method shown in FIG. 2 and the method shown in FIG. 3 can be applied together. That is, the second image 112 can be displayed on the receiving terminal 102 when the touch means is positioned within a preset distance from the user terminal 100 and when the touch means lightly touches the user terminal 100.

Referring to FIGS. 5A to 5E, a more detailed description of setting the sensing levels for the embodiments illustrated in FIG. 2 and FIG. 3 is provided below.

The user terminal 100 can be set to have multiple sensing levels. For example, a first level, a second level, and a third level can be set at the user terminal 100 The first level may correspond to sensing a nearness of a touch means 504 which is not contacting the user terminal 100. The second level may correspond to sensing the touch means 504 touching with a level equal to or smaller than a preset level (pressure level or area level). The third level may correspond to sensing the touch means 504 touching with a level equal to or greater than a preset level (pressure level or area level).

A description is provided below of the operations of the user terminal 100 and the receiving terminal 102 when multiple levels are set as above.

Figure 5A:
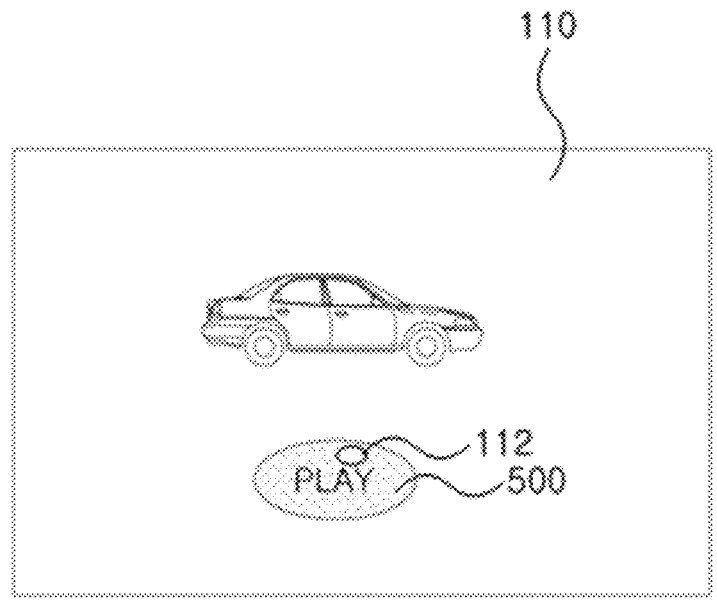
FIG. 5A, FIG. 5B, FIG. 5C, FIG. 5D, and FIG. 5E illustrate a linkage operation when sensing levels are set according to an embodiment.
Figure 5B:
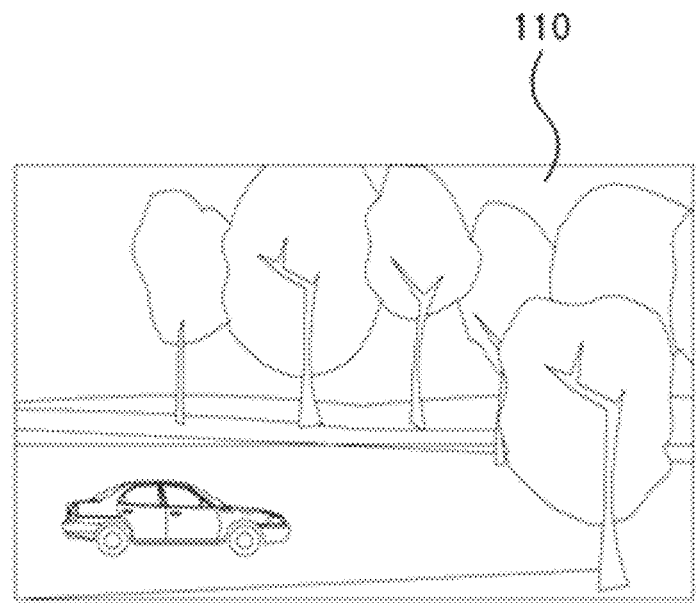
Figure 6A:
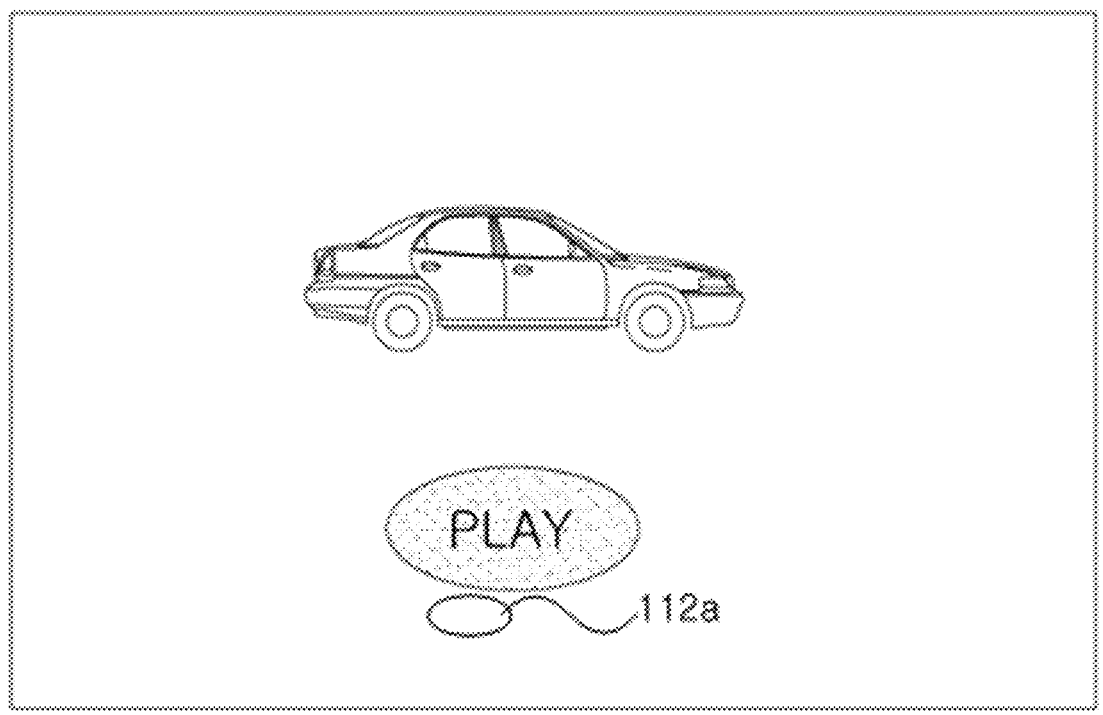
FIG. 6A and FIG. 6B illustrate a method of showing a second image according to an embodiment.
Figure 6B:
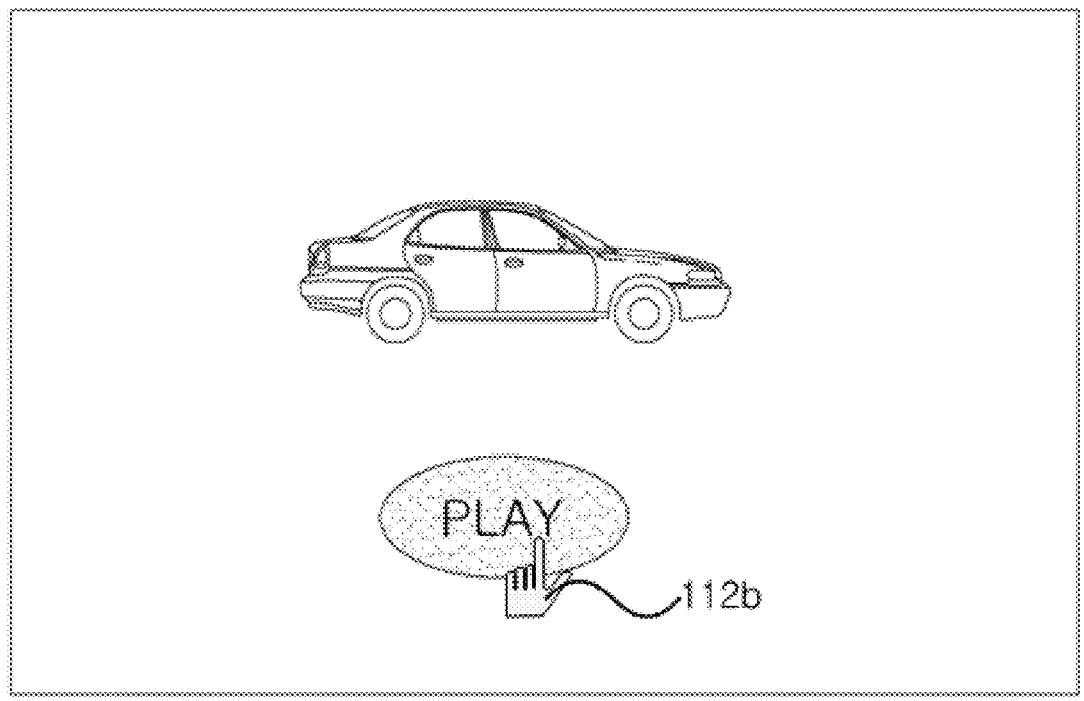

At the receiving terminal 102, the first image 110 can be displayed as illustrated in FIG. 5A. Of course, the same first image 110 can also be displayed at the user terminal 100. The first image 110 can include event-executing objects 500 such as icons, application programs, links, etc., and when an event-executing object 500 is selected, the game can be executed as illustrated in FIG. 5B. In the descriptions that follow, it will be assumed that the touch position of the touch means 504 corresponds to a particular point on the event-executing object 500.

Figure 5C:
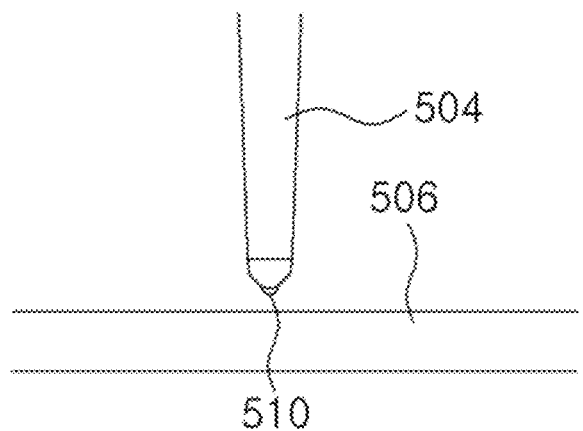

First, when the touch means 504 is brought near but not contacting the display unit 506 of the user terminal 100, as illustrated in FIG. 5C, the second image 112 indicating the position of the touch means 504 can be displayed on the receiving terminal 102 as illustrated in FIG. 5A.

Figure 5D:
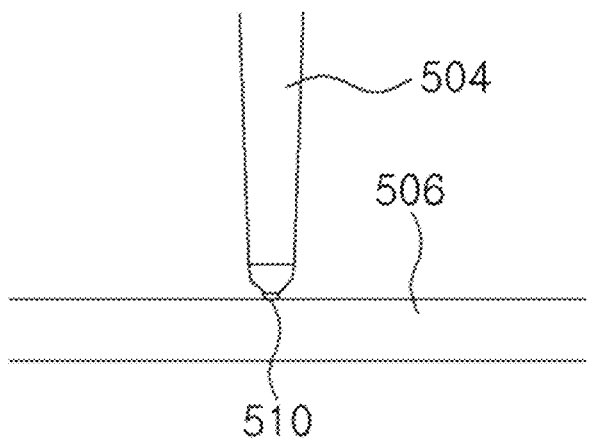

Next, when the touch means 504 touches the display unit 506 with a pressure level smaller than or equal to a preset pressure level as illustrated in FIG. 5D, the second image 112 indicating the position of the touch means 504 can remain as is, without executing the event-executing object 500.

Figure 5E:
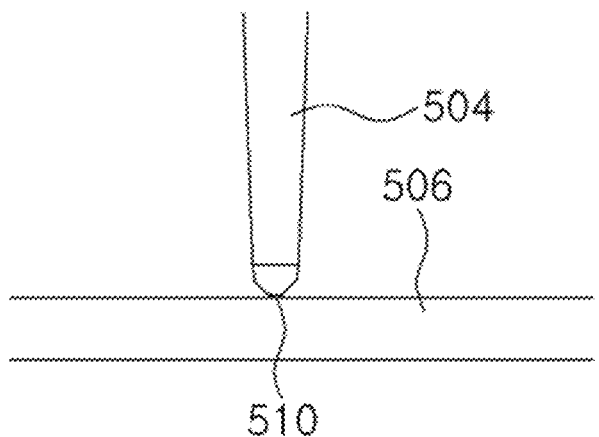

When the touch means 504 touches the display unit 506 with a pressure level greater than or equal to the preset pressure level as illustrated in FIG. 5E, the user terminal can recognize this as a selection of the event-executing object 500 and execute the game. The distal end 510 of the touch means 504 can be structured such that a portion can be inserted inside, and when the user makes a touch with the touch means 504 with a level greater than or equal to a preset level, the display unit 506 may be pressed with the distal end 510 inserted inside, as illustrated in FIG. 5E.

In short, a linkage and control system based on this embodiment can perform different operations according to sensing levels.

According to an embodiment, the levels can also be set such that the second image 112 indicating the position of the touch means 504 is shown on the receiving terminal 102 when the touch means 504 is drawn near the user terminal 100, and the event-executing object 500 is executed when the touch means 504 touches the display unit 506.

According to an embodiment, a method of linking and controlling terminals can further include changing the second image 112 to a third image when a particular event occurs, or providing information related to the occurrence of a particular event. Changing the image and providing the event occurrence information can be performed together or selectively. The particular event can involve a preset position of the touch means or a touch input for selecting an icon. The preset position of the touch means can correspond to a position of an item such as an icon, a folder, etc., that can be selected and executed by the user, or an Internet address input window, the bottom of the screen, a search window, and the like.

For example, when the touch means is positioned within a preset distance from the user terminal 100 or lightly touching the user terminal 100 and is not positioned over an event-executing object displayed on the user terminal 100, the second image 112 may become a second image 112a, which can be, for example, a circular image such as that illustrated in FIG. 6A. When the touch means is positioned over an event-executing object displayed on the user terminal 100, i.e., when a particular event occurs, the second image 112 can change to a second image 112b, which can be, for example, shaped as a finger such as that illustrated in FIG. 6B. Thus, the user can see from the finger image 112b that the event-executing object is an object that can be selected and executed. In addition, the user terminal 100 can provide occurrence information for a particular event. The event occurrence information can be information in the form of vibration, sound, or light. Such event occurrence information will be described in more detail below.

In another example, after the second image 112 is shown, when the touch means touches an icon on the user terminal 100 and the touch of the touch means is recognized as a touch input, the second image 112 can change to a third image to be displayed on the receiving terminal 102, and event occurrence information can be provided.

In still another example, the second image 112 shown when the touch means is brought near the user terminal 100 can be different from the second image 112 shown when the touch means touches the user terminal 100.

With reference to the accompanying drawings, a description will now be provided of various methods for sensing the touch means.

A basic method for sensing the touch means is to utilize a capacitance-based touch panel and use a touch means such as a finger, etc., that conducts electricity as the display unit of the user terminal 100. In this case, a sensing unit of the user terminal 100 may sense the position of the touch means through changes in capacitance that occurs when the touch means is near the user terminal 100 or is in contact with the user terminal 100.

There are also other methods for sensing the touch means, some of which are described below with reference to FIGS. 7 to 9.

Figure 7:
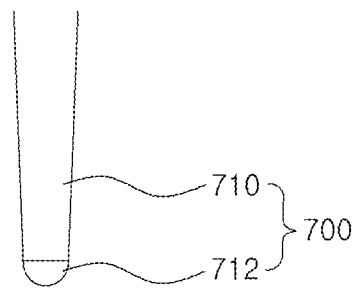
FIG. 7 illustrates a method of sensing a touch means according to an embodiment.
Figure 7:
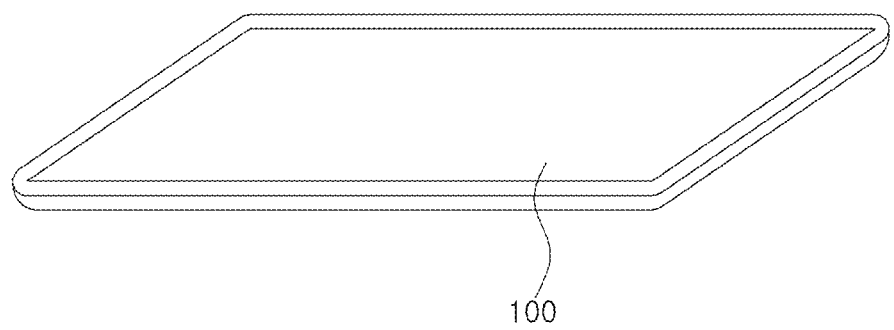

FIG. 7 illustrates a method of sensing a touch means according to an embodiment.

Referring to FIG. 7, a touch pen or stylus 700 can be used as the touch means intended for touching the user terminal 100. A capacitance-based touch panel can be used for the user terminal 100.

The touch pen 700 may be composed of a body 710 and a touch part 712. The body 710 may be made of an electrically non-conducting material, while the touch part 712 may be a conductor. Thus, because of the touch part 712, a change in capacitance may occur when the touch pen 700 is brought near the user terminal 100 or is touching the user terminal 100, and the user terminal 100 can sense the touch pen 700 by way of such change in capacitance. That is, unlike a conventional touch pen, which cannot be used with capacitive type methods, the touch pen 700 according to an embodiment can also be used with capacitive type methods. Of course, it is possible to fabricate the whole touch pen 700 as a conductor, but due to cost considerations, it may be advantageous to fabricate only the touch part 712 as a conductor, since it is the part where a touch actually occurs.

Figure 8A:
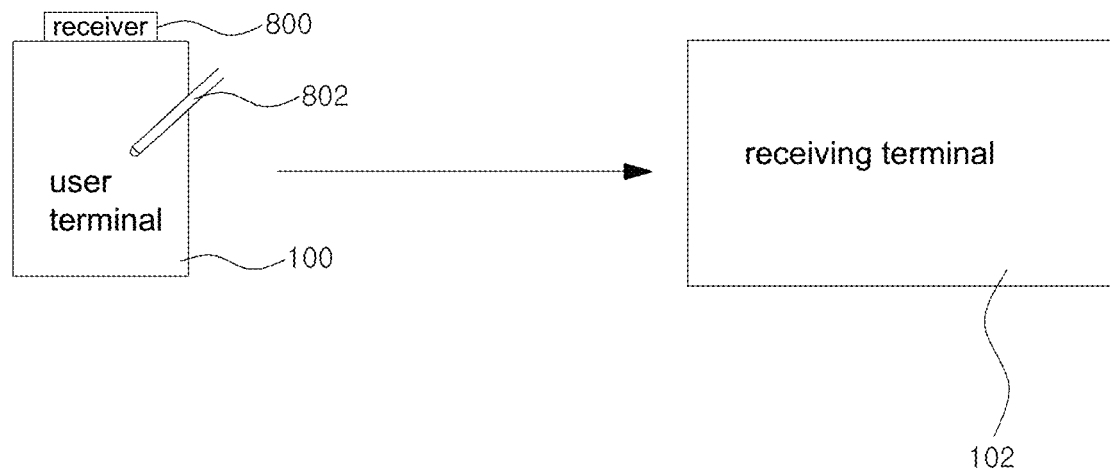
FIG. 8A and FIG. 8B illustrate a method of sensing a touch means according to an embodiment.
Figure 8B:
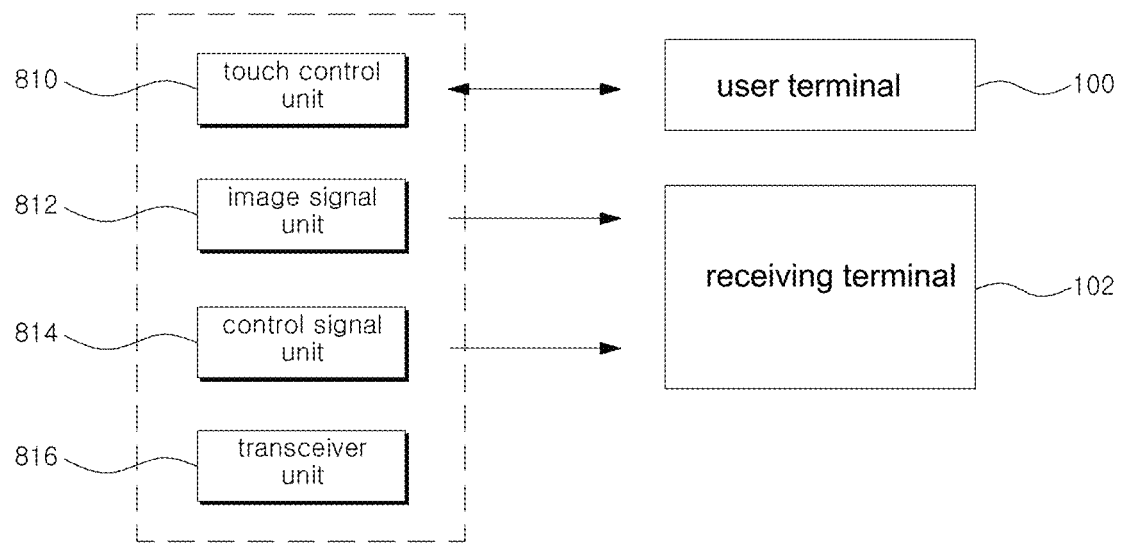

FIG. 8A and FIG. 8B illustrate a method of sensing a touch means according to an embodiment.

Referring to FIG. 8A, a receiver 800 can be installed on a portion of the user terminal 100, and a touch pen 802 can be used.

The receiver 800 can include an infrared sensor and two ultrasonic sensors to sense the movement of the touch pen 802 by receiving the infrared rays and ultrasonic waves emitted from the touch part (pen tip) of the touch pen 802, and can transmit the position information of the touch pen 802 obtained in accordance with the sensing results to the receiving terminal 102. The receiving terminal 102 may display a second image 112 that represents the transmitted position information. Consequently, the second image 112 may be displayed together with the first image 110. Here, the position information can be transmitted to the receiving terminal 102 by the receiver 800 or by the user terminal 100.

Looking at an example method by which the receiver 800 may detect the position of the touch pen 802, the three sensors may measure the transmission times of the infrared rays and the transmission times of the ultrasonic waves, respectively, convert the transmission times into distance, and apply a method such as triangulation, etc., on the converted distances, to detect the position of the touch pen 802. Thus, the position of the touch pen 802 can be sensed even if the touch pen 802 is merely near the user terminal 100 without directly touching the user terminal 100, and the contact and movement of the touch pen 802 can be accurately sensed. Of course, signals other than infrared rays and ultrasonic waves can also be used.

The second image 112 that indicates the position of the touch pen 802 can be shown on the receiving terminal 102 only without being shown on the user terminal 100, or can be shown on both the user terminal 100 and the receiving terminal 102.

According to an embodiment, the receiver 800 can perform not only the function of sensing the position of the touch pen 802 but also the function of transmitting image data and the position information to the receiving terminal 102. To be more specific, the receiver 800 can include a touch control unit 810, an image signal unit 812, a control signal unit 814, and a transceiver unit 816, as illustrated in FIG. 8B.

The touch control unit 810 may serve to sense the position of the touch pen 802 by using the received infrared rays and ultrasonic waves and provide the user terminal 100 with the information on the sensed position. The user terminal 100 may show the position of the touch pen 802 or perform a related operation in accordance to the information thus provided.

The image signal unit 812 can be provided with image data from the user terminal 100 and transmit the image data thus provided to the receiving terminal 102 via the transceiver unit 816.

The control signal unit 814 may serve to transmit a control signal, which includes the position information of the touch pen 802 obtained above by sensing, to the receiving terminal 102. That is, since the receiver 800 transmits the image data transmitted from the user terminal 100 and the position information of the touch pen 802 to the receiving terminal 102, the user terminal 100 does not have to include a communication function. Therefore, even with a terminal that does not have a communication function or a terminal that has a communication function but is unable to use the related communication facilities, it is possible to recognize the position and action of the touch pen 802 using the receiver 800 as well as to employ a linkage method according to an embodiment for sharing images, displaying the second image 112, etc.

In an embodiment, the receiver can be incorporated into the user terminal 100 to be implemented as a single body.

Figure 9:
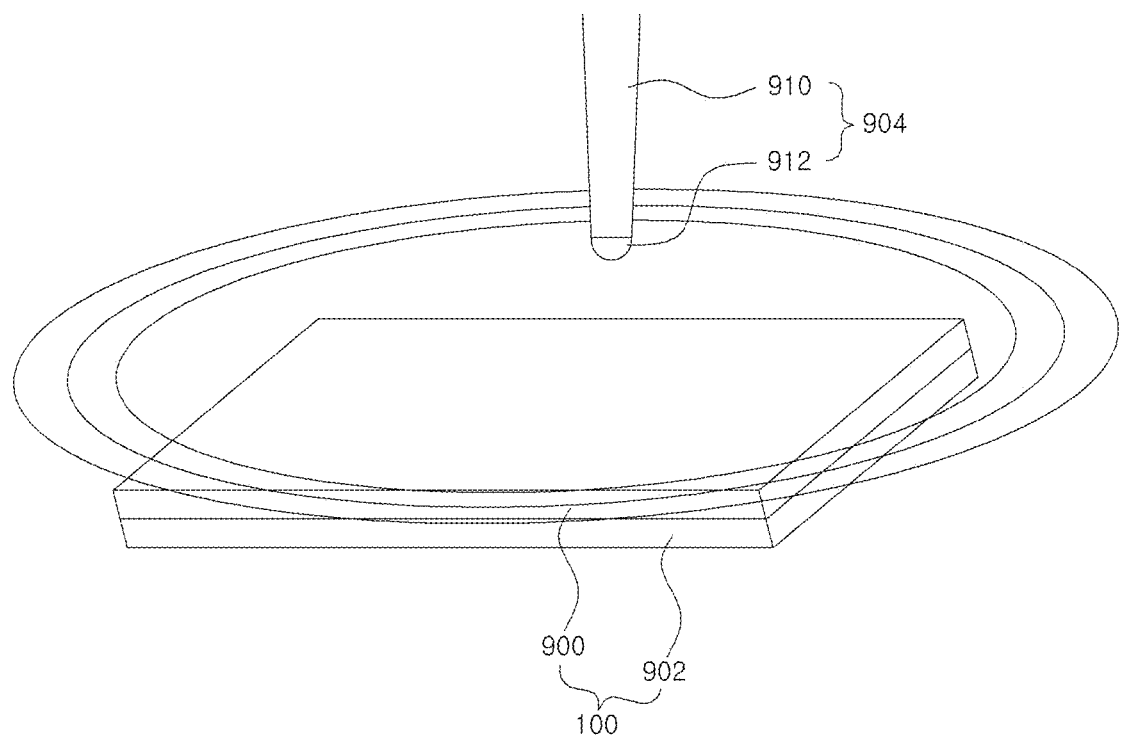
FIG. 9 illustrates a method of sensing a touch means according to an embodiment.

FIG. 9 illustrates a method of sensing a touch means according to an embodiment.

Referring to FIG. 9, the user terminal 100 can include a touch panel 900 and an electromagnetic field generator unit 902.

The electromagnetic field generator unit 902 can be connected to a rear surface of the touch panel 900 and can be made of a thin metal film to generate an electromagnetic field when electricity is applied.

The touch pen or stylus 904 may include a body 910 and a touch part 912, where the touch part 912 can preferably be made of a small metal coil. Consequently, when the touch pen 904 is brought near the touch panel 900, electromagnetic induction may occur in the touch part 912, and as a result, an alteration may occur in the electromagnetic field created by the electromagnetic field generator unit 902. Thus, the user terminal 100 may recognize the position of the touch pen 904 by sensing this alteration in the electromagnetic field. In particular, since the alteration of the electromagnetic field would differ according to the nearness and touch strength of the touch pen 904, this method of sensing the touch means can minutely sense the degree of nearness and the touch pressure of the touch pen 904 with respect to the touch panel 900. Thus, in cases where the size of the second image 112 shown on the receiving terminal 102 is represented as a line, the line thickness, etc., can be shown differently according to the position or pressure of the touch pen 904. Of course, the shape, size, or color of the second image 112 can also vary according to the touch strength.

Summarizing the descriptions referring to FIGS. 7 to 9, the user terminal 100 can adopt various methods to sense the touch pen and reflect the sensing results at the receiving terminal 102.

Figure 10:
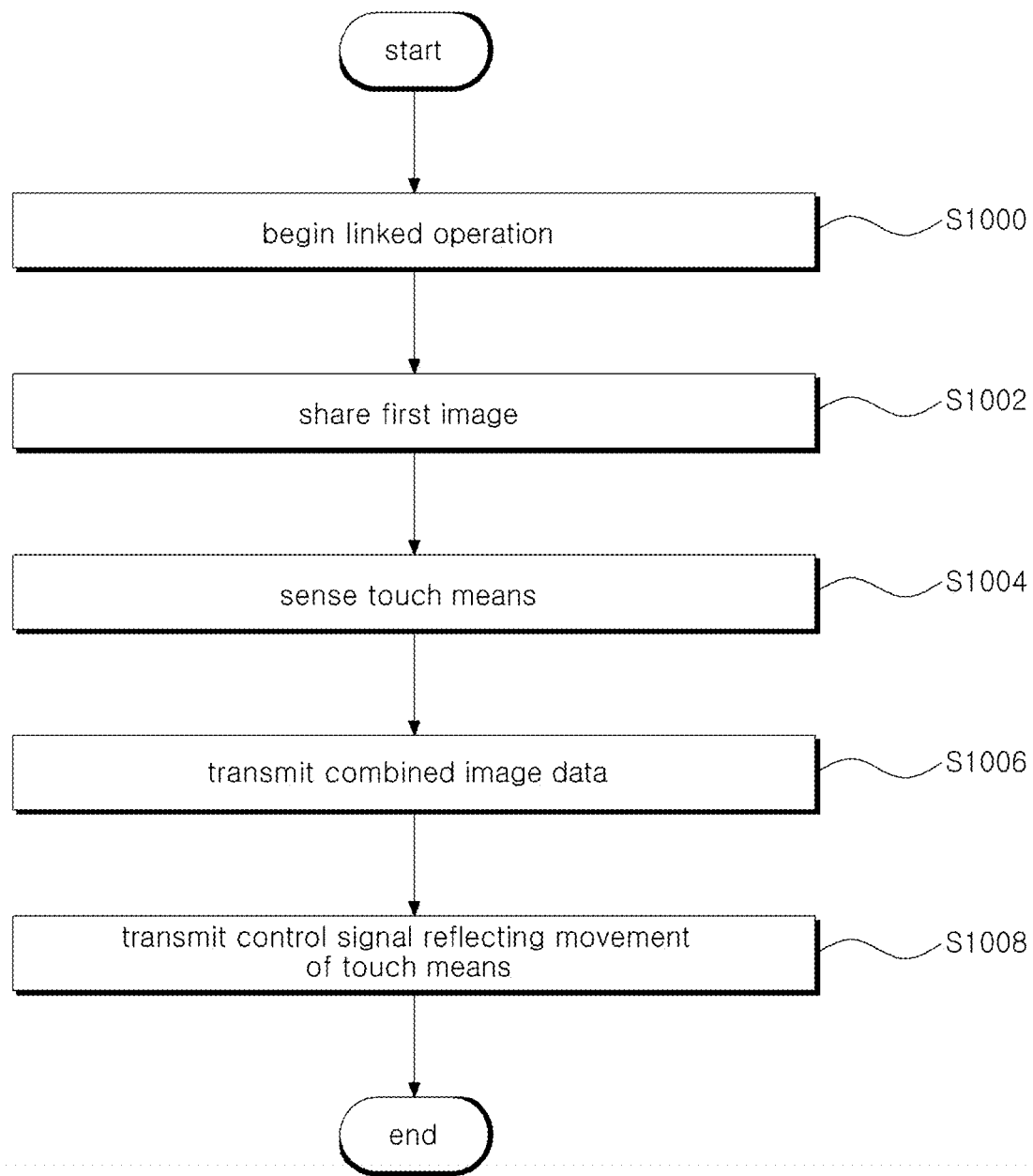
FIG. 10 is a flowchart illustrating a method of linking and controlling terminals according to an embodiment.

FIG. 10 is a flowchart illustrating a method of linking and controlling terminals according to an embodiment.

Referring to FIG. 10, the user terminal 100 and the receiving terminal 102 may begin linked operation (S1000).

Next, the user terminal 100 may transmit the image data corresponding to the currently displayed first image 110 to the receiving terminal 102, and the receiving terminal 102 may display a first image 110 corresponding to the image data (S1002). That is, the user terminal 100 and the receiving terminal 102 may share the first image 110.

Then, the user terminal 100 may sense a touch means, such as a finger, a touch pen, etc., through any of a variety of methods (S1004). The user terminal 100 can sense the position of a touch means that is near the user terminal 100 or lightly touching the user terminal 100.

Next, the user terminal 100 may generate a combined image, including the currently displayed first image 110 together with the second image 112 corresponding to the sensed position of the touch means, and may transmit combined image data (combination information) corresponding to the combined image to the receiving terminal 102, and the receiving terminal 102 may display the combined image corresponding to the combined image data (S1006). Consequently, the second image 112 together with the first image 110 may be displayed on the receiving terminal 102. In this case, the user terminal 100 can display the first image 110 only or display the first image 110 and the second image 112 together.

When the user makes a touch with the touch means or moves the touch means while touching, the user terminal 100 may transmit the position information of the touch means to the receiving terminal 102, and the receiving terminal 102 may display the second image 112, which indicates the position of the touch means in accordance with the position information, together with the corresponding first image 110 (S1008). That is, the movement of the touch means may be reflected in the screen of the receiving terminal 102. The first image 110 on the receiving terminal 102 may be the same image as the previous image or may be a different image from the previous image.

In short, in contrast to an embodiment in which the receiving terminal 102 generates the second image 112 and displays it together with the first image 110, this embodiment has the user terminal 100 generate a combined image that includes the first image 110 and the second image 112 and transmit the combined image thus generated to the receiving terminal 102, so that the receiving terminal 102 may consequently display the second image 112 together with the first image 110.

Although the descriptions above use the expression "combined image," it is possible to modify the first image 110 itself such that the first image 110 indicates the position of the touch means. That is, the modified first image can be substantially the same as the combined image.

Figure 11:
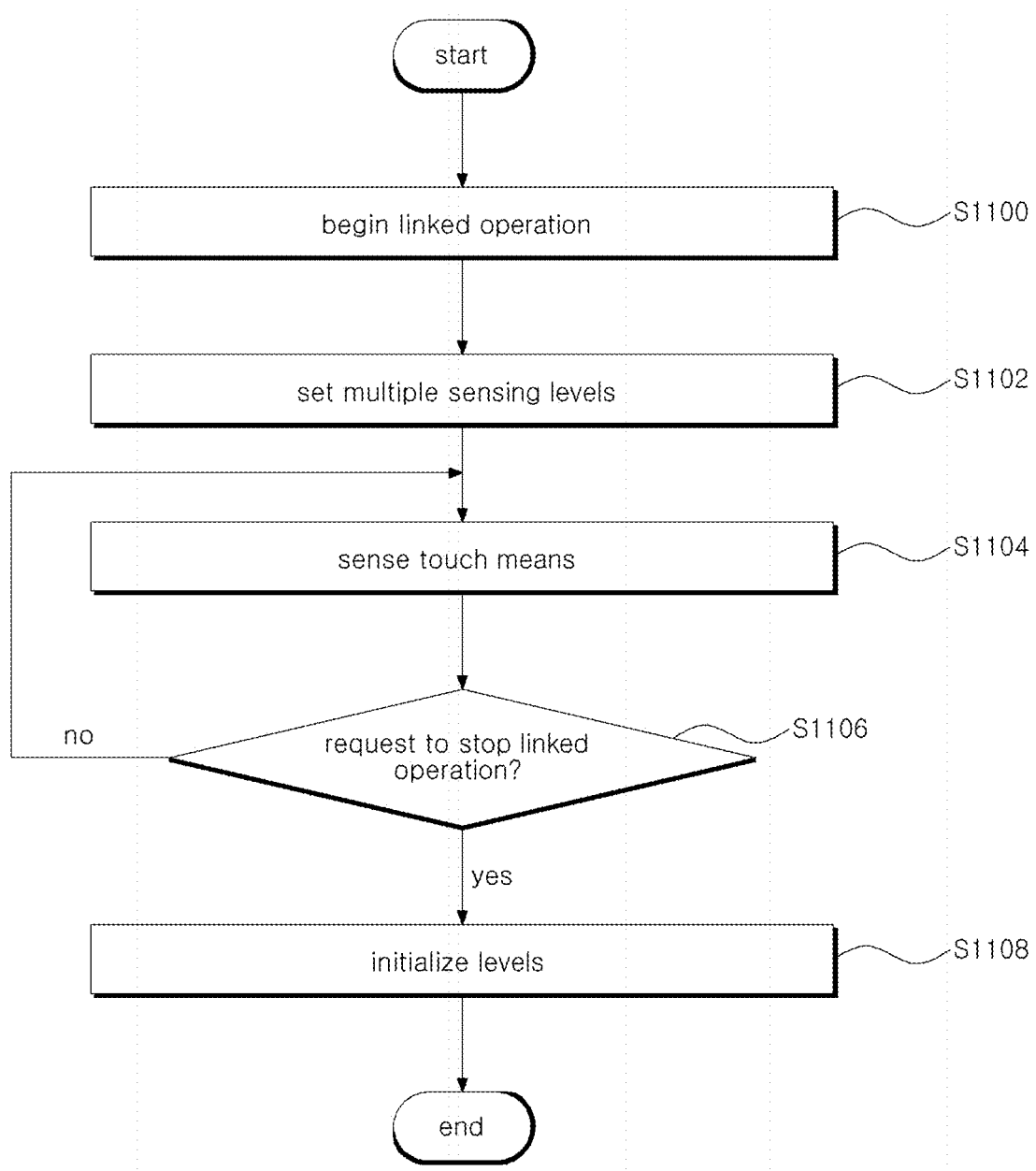
FIG. 11 is a flowchart illustrating a method of linking and controlling terminals according to an embodiment.

FIG. 11 is a flowchart illustrating a method of linking and controlling terminals according to an embodiment.

Referring to FIG. 11, the user terminal 100 and the receiving terminal 102 may begin linked operation (S1100).

Next, the user or the user terminal 100 may set multiple sensing levels for sensing the touch means (S1102). More specifically, a first level may be set that enables sensing the touch means when the touch means is near the user terminal 100, and a second level may be set that enables sensing the touch means when the touch means makes a touch. Of course, the levels for sensing the touch means can be set more minutely. For example, a first level, a second level, and a third level can be set; where a first level for when the touch means is nearby, a second level for when the touch means makes a touch with a pressure smaller than or equal to a preset pressure value, and a third level for when the touch means makes a touch with a pressure greater than or equal to a preset pressure value. Such settings may be established at the beginning of the linked operation or may be established beforehand in the user terminal 100 prior to linked operation.

Then, the user terminal 100 may sense the touch means, and the receiving terminal 102 may display the second image 112, which represents the sensed position of the touch means (S1104).

Next, it may be determined whether or not there was a request by the user to stop linked operation (S1106). The stopping of linked operation can be requested by the user by a method such as a menu selection, etc., or can also be requested by turning off the connection between the user terminal 100 and the receiving terminal 102. The user, controlling the user terminal 100 while viewing the receiving terminal 102, may wish to use the user terminal 100 only or may wish to view the receiving terminal 102 only, in which case the user can request for a stopping of linked operation while the user terminal 100 and the receiving terminal 102 are in a connected state.

If there is no request from the user to stop the linked operation, then step S1104 may be performed again.

Conversely, if there is a request from the user to stop linked operation, then the user terminal 100 may initialize the multiple levels such that only one level is available or change the levels to sensing levels which only sense touches (S1108). That is, the user terminal 100 may change the levels such that the touch means is not sensed when the touch means does not make a touch, and that the touch means is sensed only when the touch means makes a touch.

In short, a method of linking and controlling terminals according to an embodiment can allow a user to arbitrarily request linked operation and request a stopping of the linked operation and to freely set and change sensing levels.

According to an embodiment, a preliminary sensing level can be set at the beginning of linked operation between the user terminal 100 and receiving terminal 102, and the sensing levels can be set differently during linked operation. For example, the user can set different sensing levels during linked operation according to the nearness distance (proximity) and touch strength of the touch means and can change the sensing level settings to sense the touch means only when it is in contact.

That is, regarding setting the sensing levels, a user terminal 100 according to an embodiment can set the sensing levels differently according to the user's request in cases where the user terminal 100 and the receiving terminal 102 are in linked operation or are not in linked operation.

In an embodiment, the user terminal 100 can distinguish the touch modes to a near touch mode, which recognizes both the position of the touch means near the display unit and the position of the touch means touching the display unit; and a direct touch mode, which recognizes only the touch of the touch means touching the display unit; and the sensing levels can be set differently according to the mode. This will be described later in further detail.

Figure 12:
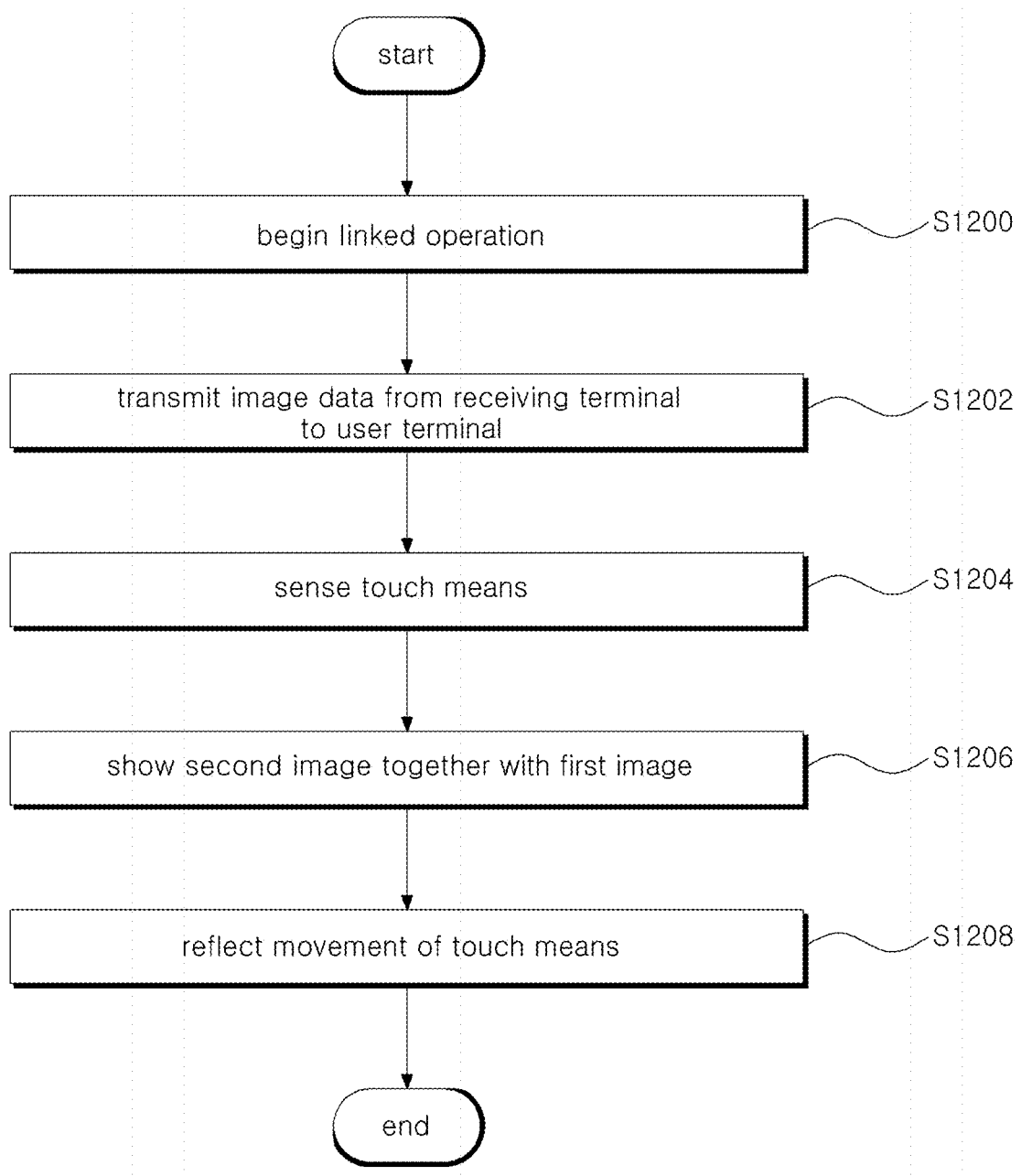
FIG. 12 is a flowchart illustrating a method of linking and controlling terminals according to an embodiment.

FIG. 12 is a flowchart illustrating a method of linking and controlling terminals according to an embodiment.

Referring to FIG. 12, a user terminal 100 and a receiving terminal 102 may be connected to begin linked operation (S1200).

Next, the receiving terminal 102 may transmit image data corresponding to a first image 110 currently being displayed or about to be displayed to the user terminal 100, and the user terminal 100 may display the first image 110 corresponding to the transmitted image data (S1202). That is, the user terminal 100 and the receiving terminal 102 may share the first image 110.

Then, when a user brings near a touch means such as a finger or a touch pen, etc., then the user terminal 100 may sense the touch means (S1204). The user terminal 100 can sense the touch means using various methods such as capacitive sensing, electromagnetic sensing, etc.

Next, the user terminal 100 may transmit the position information of the touch means obtained according to the sensing result to the receiving terminal 102, and the receiving terminal 102 may display a second image 112, which represents the position information of the touch means transmitted thus, together with the first image 110 (S1206). According to an embodiment, the user terminal 100 can also transmit image data (or combined image data) that includes data corresponding to the first image 110 and data corresponding to the second image 112 to the receiving terminal 102. However, since this embodiment basically involves the receiving terminal 102 transmitting the image data corresponding to the first image 110 to the user terminal 100, the former method of the user terminal 100 transmitting only the position information to the receiving terminal 102 may be more efficient.

Then, when the user makes a touch with or moves the touch means, the user terminal 100 may transmit the position information of the touch means to the receiving terminal 102 to display the second image 112 or a third image on the receiving terminal 102 (S1208).

Figure 13A:
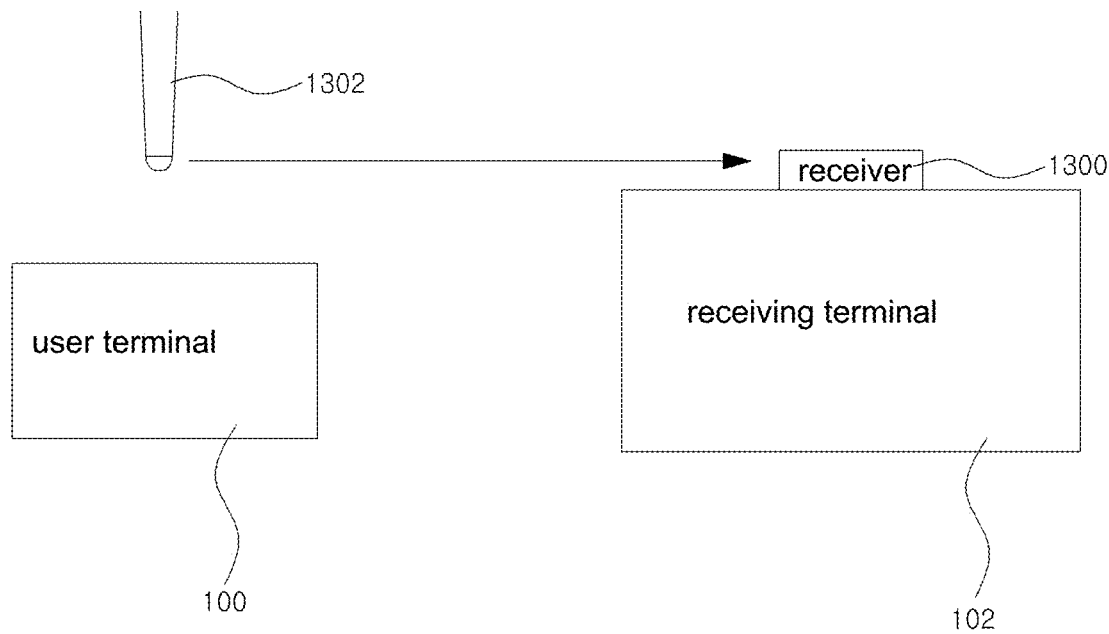
FIG. 13A and FIG. 13B illustrate a system for linking and controlling terminals according to an embodiment.
Figure 13B:
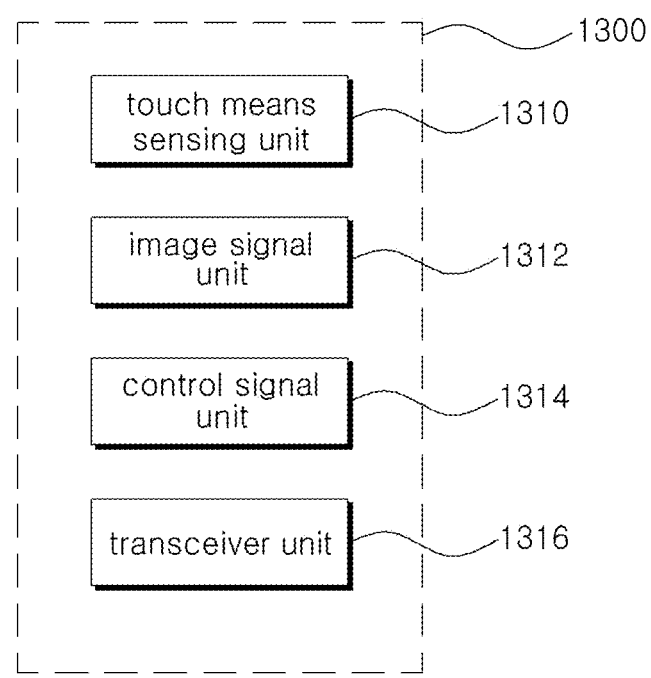

FIG. 13A and FIG. 13B illustrate a system for linking and controlling terminals according to an embodiment.

Referring to FIG. 13A, in a system for linking and controlling terminals according to an embodiment, a receiver 1300 can be installed or built into the receiving terminal 102 rather than the user terminal 100.

When a touch pen 1302 serving as the touch means for the user terminal 100 emits ultrasonic waves and infrared rays to the receiver 1300 installed in the receiving terminal 102, the receiver 1300 may receive the ultrasonic waves and infrared rays to sense the position of the touch pen 1302.

The receiver 1300 may transmit information regarding the position of the touch pen 1302 thus sensed to the receiving terminal 102, and the receiving terminal 102 may display the second image 112 representing the position of the touch pen 1302 together with the first image 110. Of course, the user terminal 100 and the receiving terminal 102 may display the second image 112 while sharing the first image 110.

According to an embodiment, the receiver 1300 can serve not only to sense the position of the touch pen 1302 but also to perform communication. To be more specific, the receiver 1300 can include a touch means sensing unit 1310, an image signal unit 1312, a control signal unit 1314, and a transceiver unit 1316.

The touch means sensing unit 1310 may serve to sense the position of the touch pen 1302.

The image signal unit 1312 may receive the image data transmitted from the user terminal 100 by way of the transceiver unit 1316, and may transmit the received image data by way of the transceiver unit 1316 to the receiving terminal 102, to display the first image 110. Of course, the image signal unit 1312 may also receive the image data from the receiving terminal 102 and transmit the received image data to the user terminal 100.

The control signal unit 1314 can receive a control signal transmitted from the user terminal 100 related to the linked operation, etc., and can transmit the received control signal to the receiving terminal 102. Of course, the position information of the touch pen 1302 need not be transmitted from the user terminal 100 to the receiver 1300. As such, the receiver 1300 may provide not only the function of sensing the position of the touch pen 1302 but also a communication function. Thus, a linking and control method according to an embodiment can be used even when the receiving terminal 102 does not have a communication function.

According to an embodiment, the receiver 1300 can receive the image data corresponding to the first image 110 and the position information of the touch means 1302 from the user terminal 100, and the receiver 1300 can forward the received image data and position information to the receiving terminal 102. Alternatively, the receiver 1300 can convert the received image data and position information into a form suited to the receiving terminal 102 and transmit the converted image data and position information to the receiving terminal 102.

Of course, the user terminal 100 can also transmit combined data, or image data corresponding to the first image 110 in which the position of the touch means is indicated, to the receiver 1300.

Figure 14:
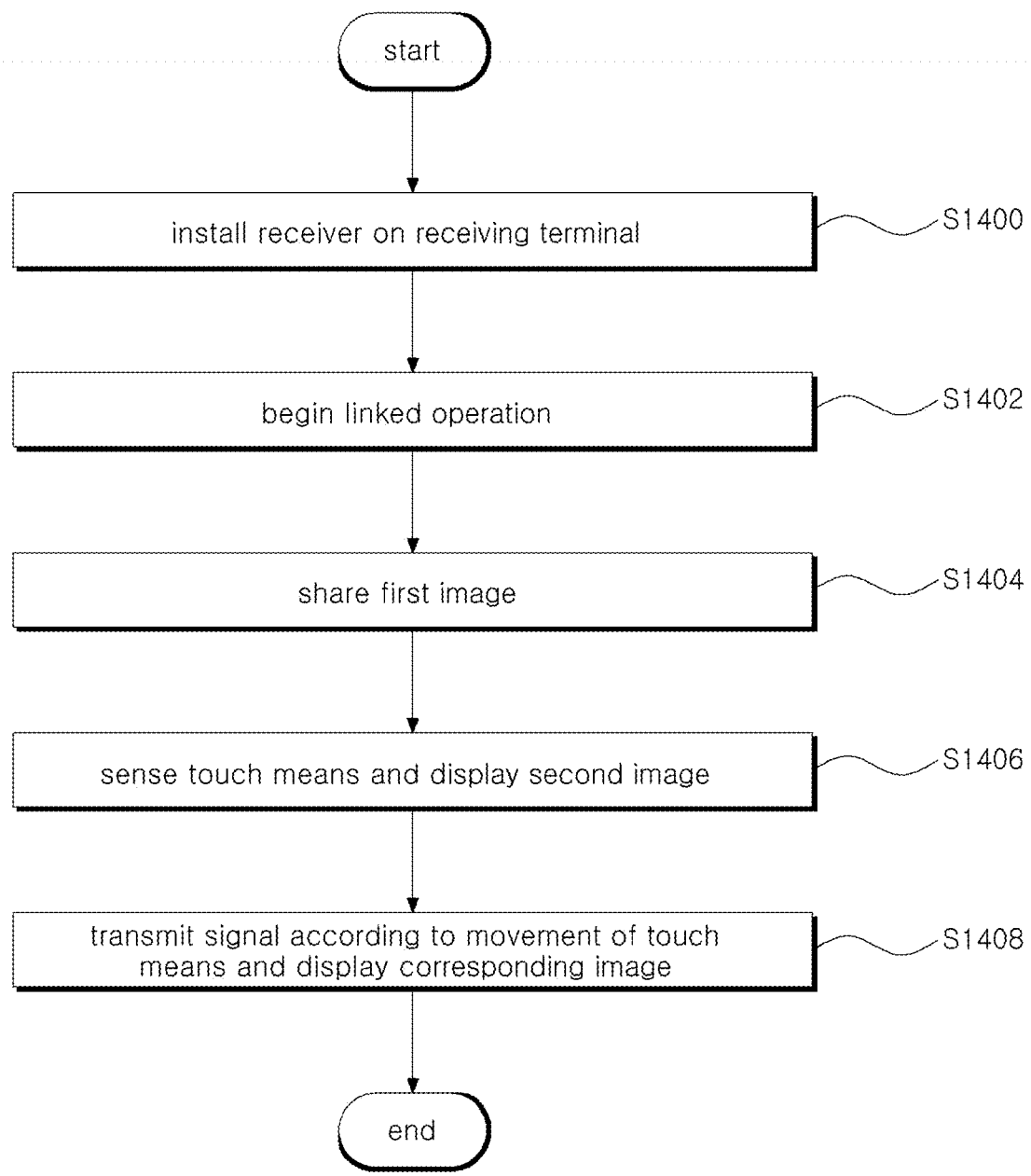
FIG. 14 is a flowchart illustrating a method of linking and controlling terminals according to an embodiment.

FIG. 14 is a flowchart illustrating a method of linking and controlling terminals according to an embodiment.

Referring to FIG. 14, a receiver 1300 may be installed in the receiving terminal 102 (S1400). According to an embodiment, the receiver 1300 can be built into the receiving terminal 102.

Next, the user terminal 100 and the receiving terminal 102 may begin linked operation (S1402).

Then, the user terminal 100 may transmit image data corresponding to the first image 110 to the receiving terminal 102 to share the first image 110, or the receiving terminal 102 may transmit the image data to the user terminal 100 to share the first image 110 (S1404).

Next, when a touch means, e.g. a touch pen 1302, is brought near the user terminal 100, the receiver 1300 may sense the position of the touch pen 1302 by way of infrared rays and ultrasonic waves emitted from the touch pen 1302 and transmit it to the receiving terminal 102, and the receiving terminal 102 may display the second image 112, which represents the position thus obtained by sensing, together with the first image 110 (S1406).

Then, when the user touches the user terminal 100 with the touch pen 1302 or moves the touch pen 1302 after touching the user terminal 100, the receiver 1300 may sense such movement of the touch pen 1302 and transmit it to the receiving terminal 102, and the receiving terminal 102 may display the second image 112 or a third image representing such movement together with the first image 110 (S1408).

Figure 15A:
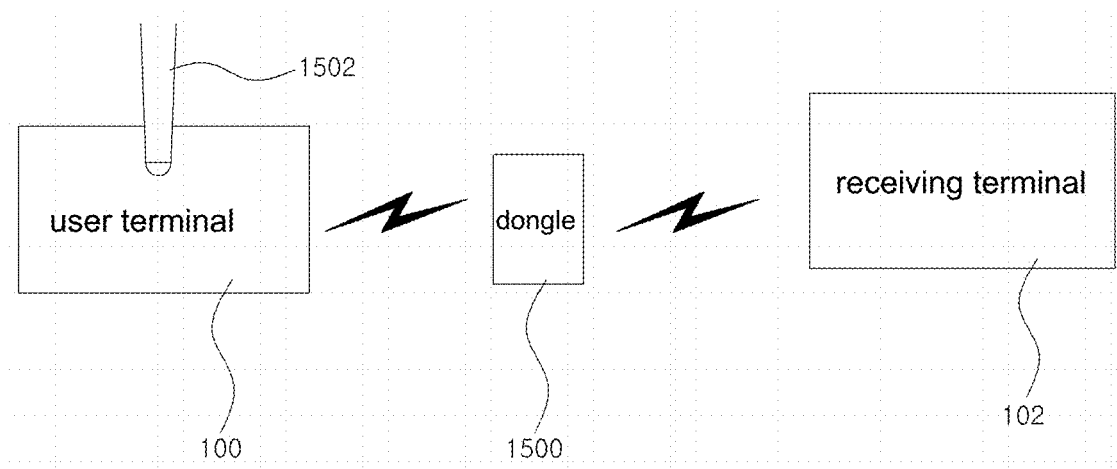
FIG. 15A and FIG. 15B illustrate a system for linking and controlling terminals according to an embodiment.
Figure 15B:
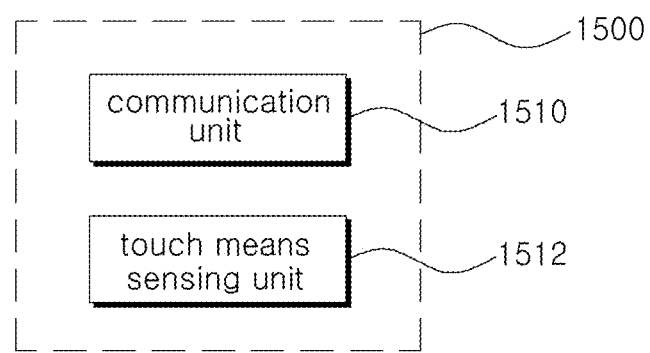

FIG. 15A and FIG. 15B illustrate a system for linking and controlling terminals according to an embodiment.

Referring to FIG. 15A, a system for linking and controlling terminals based on this embodiment can include a user terminal 100, a receiving terminal 102, and a dongle 1500.

The dongle 1500 may not only to supplement the communication of the user terminal 100 but also to sense the position of a touch pen 1502 serving as the touch means. More specifically, the dongle 1500 can include a communication unit 1510 and a touch means sensing unit 1512.

The communication unit 1510 may serve as a communication means for the user terminal 100 and can provide a particular communication function, such as Wibro communication, for example, and can also convert a particular communication function into another communication function, such as by converting Wibro to Wi-Fi, for example, to be utilized by the user terminal 100.

The touch means sensing unit 1512 may sense the position of the touch pen 1502 and transmit information on the sensed position to the receiving terminal 102, in a similar fashion as the receiver.

In short, the user terminal 100 may realize its communication function by using the dongle 1500, where the dongle 1500 can also be used to sense the position of the touch pen 1502.

According to an embodiment, the dongle 1500 can be installed inside or outside the receiving terminal 102, can receive image data and position information transmitted from the user terminal 100, and can also provide the received image data and position information to the receiving terminal 102.

Since the receiver and the dongle can be installed outside a terminal 100 or 102, they can be collectively referred to as external devices.

Figure 16:
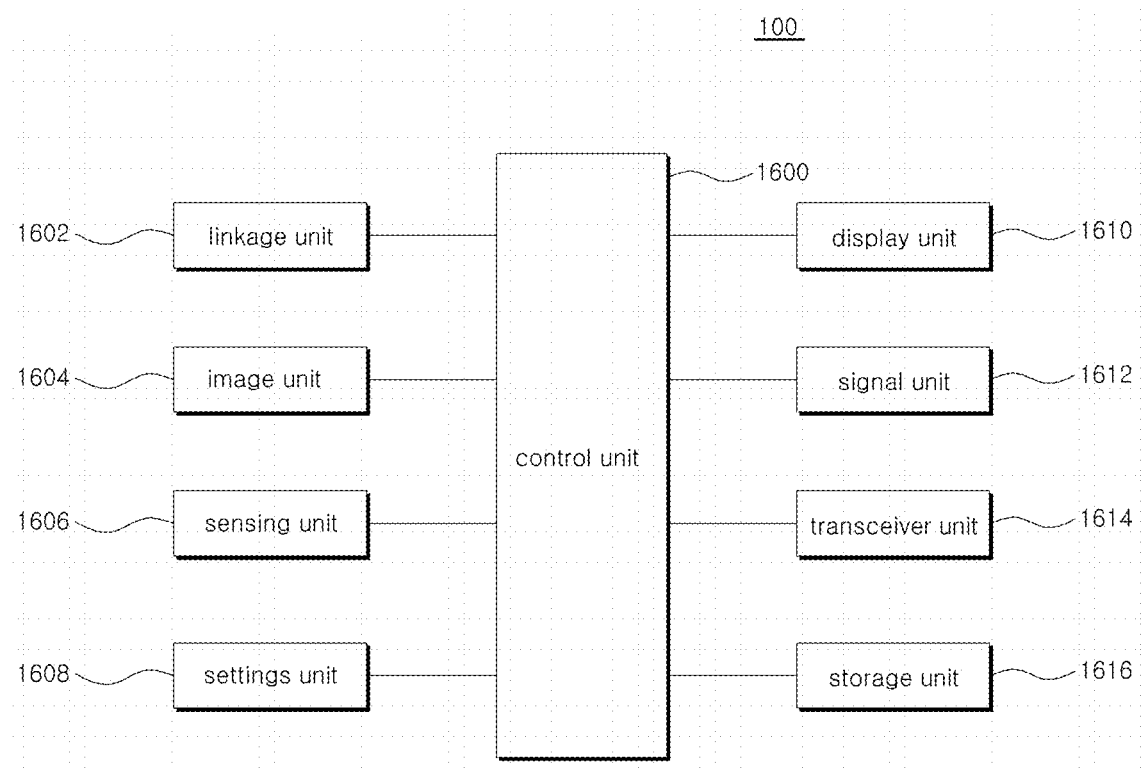
FIG. 16 is a block diagram illustrating the structure of a user terminal according to an embodiment.

FIG. 16 is a block diagram illustrating the structure of a user terminal according to an embodiment.

Referring to FIG. 16, the user terminal 100 of this embodiment can include a control unit 1600, a linkage unit 1602, an image unit 1604, a sensing unit 1606, a settings unit 1608, a display unit 1610, a signal unit 1612, a transceiver unit 1614, and a storage unit 1616.

The linkage unit 1602 may manage all functions related to linkage with the receiving terminal 102.

The image unit 1604 can generate a first image 110 that is to be shared with the receiving terminal 102 or generate a combined image that includes the second image 112 and the first image 110. The image unit 1604 may display the first image 110 by way of the display unit 1610.

The sensing unit 1606 may serve to sense a touch means, such as a finger or a touch pen, etc. More specifically, the sensing unit 1606 may sense the position of the touch means, distinguishing when the touch means is near the display unit 1610 and when it is touching the display unit 1610. The method of sensing is not limited to a particular method and can be a capacitance-based method, an electromagnetic induction-based method, etc. The information on the position of the touch means as sensed by the sensing unit 1606 can also be generated by a position information generating unit (not shown).

The settings unit 1608 may manage the settings of various functions, such as linkage function settings, sensing level settings, etc.

The display unit 1610 can be a touch panel, and can be implemented in various ways such as by using capacitance-based types, resistive overlay types, electromagnetic induction types, etc.

The signal unit 1612 may generate an image signal that includes image data corresponding to the first image 110 and a control signal that includes information on the position of the touch means. Also, the signal unit 1612 can transmit the image signal to the receiving terminal 102 through a data channel and transmit the control signal to the receiving terminal 102 through a control channel.

The transceiver unit 1614 may serve as a communication passageway to the receiving terminal 102.

The storage unit 1616 may store various data, such as the first image 110, image signals, position information, control signals, application programs, etc.

The control unit 1600 may control the overall operations of the components of the user terminal 100.

Figure 17:
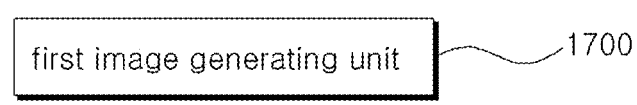
FIG. 17 is a block diagram illustrating the structure of the image unit in FIG. 16 according to an embodiment.
Figure 17:
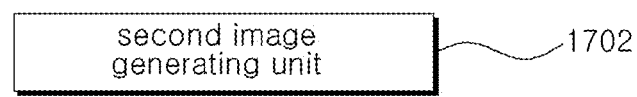
Figure 17:
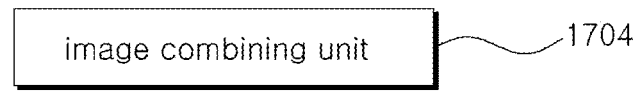

FIG. 17 is a block diagram illustrating the structure of the image unit in FIG. 16 according to an embodiment.

Referring to FIG. 17, the image unit 1604 of this embodiment can include a first image generating unit 1700, a second image generating unit (position information generating unit) 1702, and an image combining unit 1704.

The first image generating unit 1700 may generate the first image 110 that is to be shared, and the second image generating unit 1702 may generate a second image 112, such as a shadow image, etc., corresponding to the position of the touch means.

The image combining unit 1704 may generate a combined image that includes the first image 110 as well as the second image 112 generated above. In an embodiment, the user terminal 100 can transmit image data corresponding to the first image 110 to the receiving terminal 102 and transmit position indicator data corresponding to the second image 112 representing the position information of the touch means to the receiving terminal 102.

Figure 18:
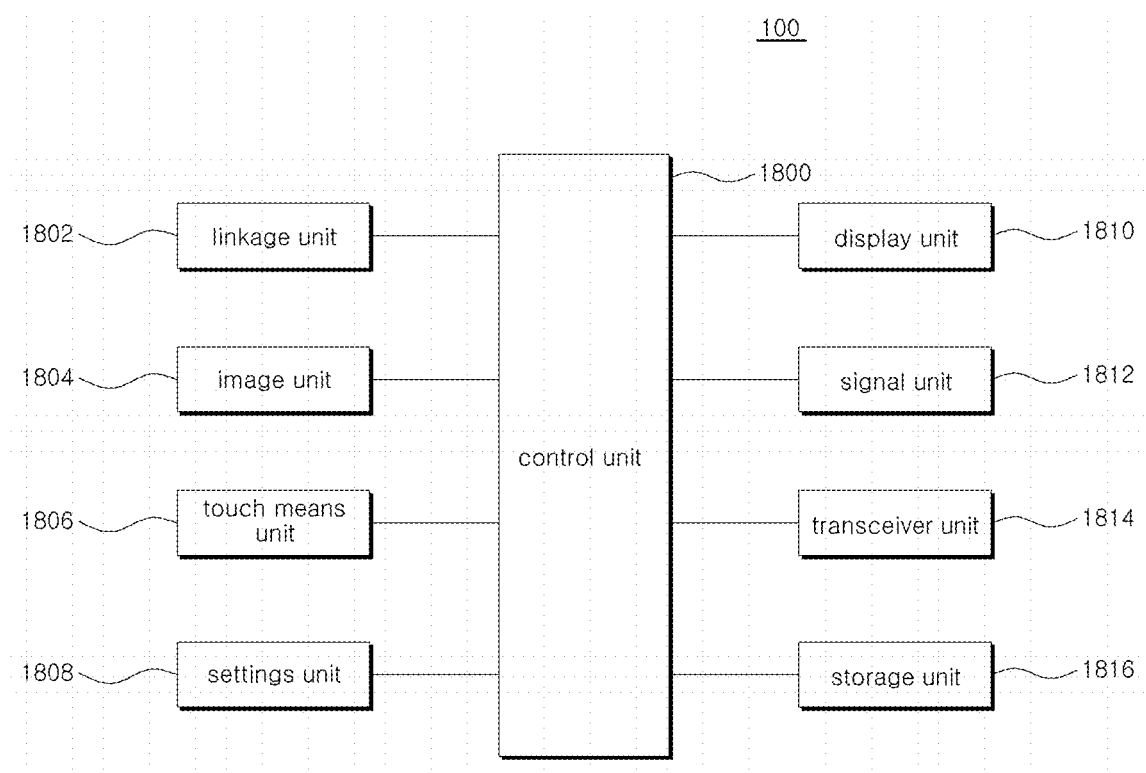
FIG. 18 is a block diagram illustrating the structure of a user terminal according to an embodiment.

FIG. 18 is a block diagram illustrating the structure of a user terminal according to an embodiment. FIG. 18 illustrates the structure of a user terminal 100 in a system for linking and controlling terminals, where a receiver is installed in the user terminal 100.

Referring to FIG. 18, the user terminal 100 of this embodiment can include a control unit 1800, a linkage unit 1802, an image unit 1804, a touch means unit 1806, a settings unit 1808, a display unit 1810, a signal unit 1812, a transceiver unit 1814, and a storage unit 1816.

In the following, descriptions of components that perform the same functions those described with respect to the earlier drawing figures are omitted.

The image unit 1804 may generate a first image 110, which will be shared with the receiving terminal 102, or generate a combined image of the first image 110 and the second image 112.

The touch means unit 1806 may receive and manage information on the position of the touch means received from the receiver. That is, the receiver may sense the position of the touch means, while the touch means unit 1806 may analyze the signals transmitted from the receiver to detect the position of the touch means.

The signal unit 1812 may create an image signal that includes image data corresponding to the first image 110, a control signal that includes information on the position of the touch means, or a combination signal that includes data corresponding to a combined image. Also, the signal unit 1812 can transmit the image signal or the combination signal to the receiving terminal 102 through a data channel and transmit the control signal to the receiving terminal 102 through a control channel.

Figure 19:
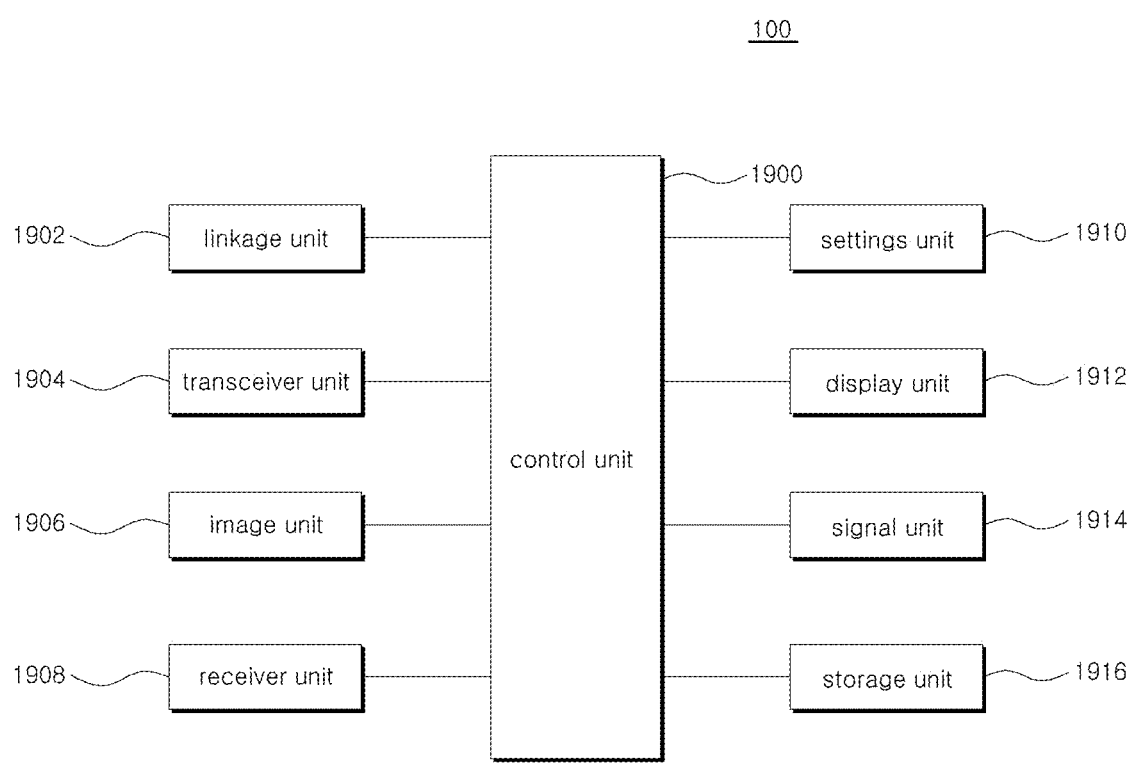
FIG. 19 is a block diagram illustrating the structure of a user terminal according to an embodiment.

FIG. 19 is a block diagram illustrating the structure of a user terminal according to an embodiment. FIG. 19 illustrates the structure of a user terminal 100 in a system for linking and controlling terminals, where a receiver is built into the user terminal 100.

Referring to FIG. 19, the user terminal 100 of this embodiment can include a control unit 1900, a linkage unit 1902, a transceiver unit 1904, an image unit 1906, a receiver unit 1908, a settings unit 1910, a display unit 1912, a signal unit 1914, and a storage unit 1916.

In the following, descriptions of components that perform the same functions as those described with respect to the earlier drawing figures are omitted.

The image unit 1906 may generate a first image 110, which will be shared with the receiving terminal 102, or generate a combined image of the first image 110 and the second image 112.

The receiver unit 1908 may receive infrared rays and ultrasonic waves transmitted from the touch means when the touch means is brought near to or in contact with the user terminal 100, and may analyze the infrared rays and ultrasonic waves thus received to detect the position of the touch means.

The signal unit 1914 may create an image signal that includes image data corresponding to the first image 110, a control signal that includes information on the position of the touch means, or a combination signal that includes data corresponding to a combined image. Also, the signal unit 1914 can transmit the image signal or the combination signal to the receiving terminal 102 through a data channel and transmit the control signal to the receiving terminal 102 through a control channel.

Figure 20:
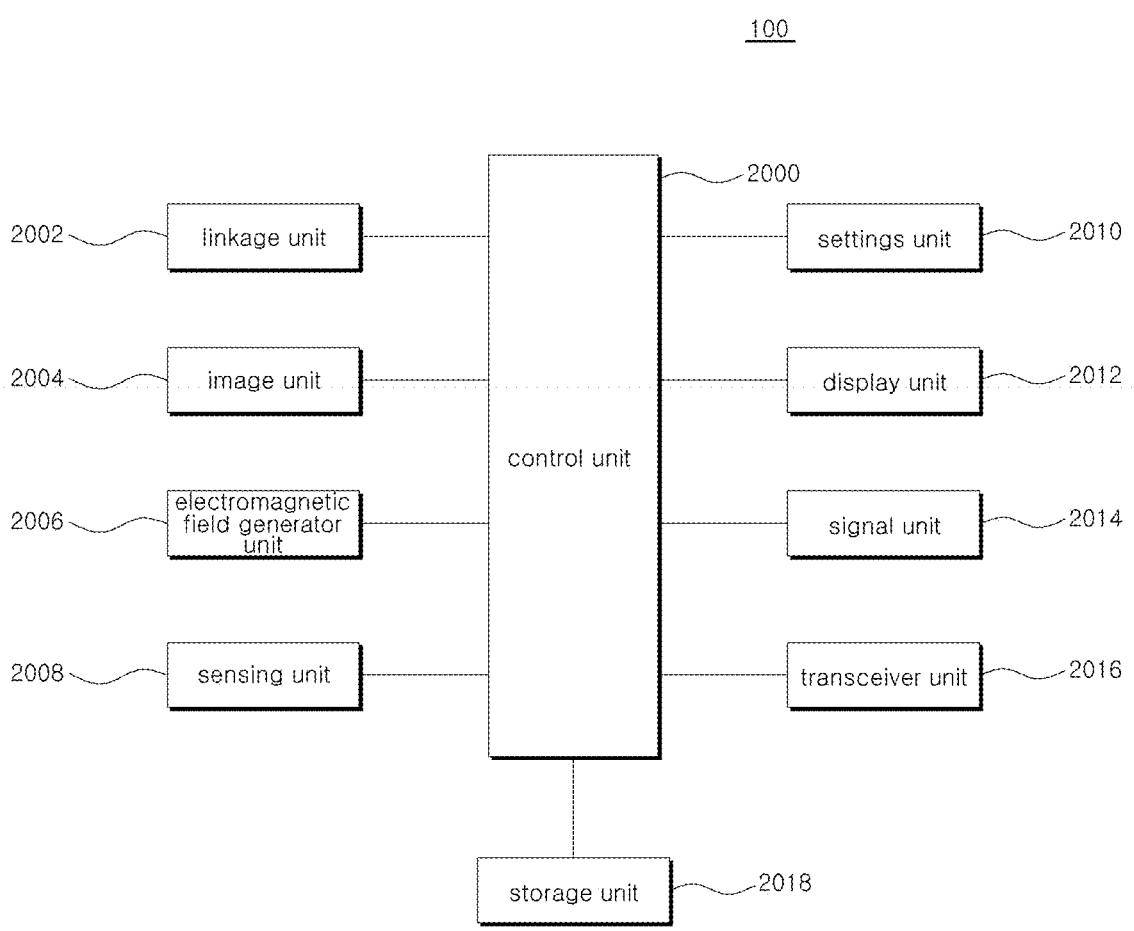
FIG. 20 is a block diagram illustrating the structure of a user terminal according to an embodiment.

FIG. 20 is a block diagram illustrating the structure of a user terminal according to an embodiment. FIG. 20 illustrates the structure of a user terminal 100 that uses a method based on electromagnetic induction.

Referring to FIG. 20, the user terminal 100 of this embodiment can include a control unit 2000, a linkage unit 2002, an image unit 2004, an electromagnetic field generator unit 2006, a sensing unit 2008, a settings unit 2010, a display unit 2012, a signal unit 2014, a transceiver unit 2016, and a storage unit 2018.

In the following, descriptions of components that perform the same functions as those described with respect to the earlier drawing figures are omitted.

The image unit 2004 may generate a first image 110, which will be shared with the receiving terminal 102, or generate a combined image of the first image 110 and the second image 112.

The electromagnetic field generator unit 2006 may serve to create an electromagnetic field for sensing the touch means by electromagnetic induction, and may preferably be arranged on a rear surface of the display unit 2012.

The sensing unit 2008 may sense changes in the electromagnetic field caused by the coil of the touch means to thereby sense the position of the touch means.

The signal unit 2014 may create an image signal that includes image data corresponding to the first image 110, a control signal that includes information on the position of the touch means, or a combination signal that includes combined image data. Also, the signal unit 2014 can transmit the image signal or the combination signal to the receiving terminal 102 through a data channel and transmit the control signal to the receiving terminal 102 through a control channel.

Figure 21:
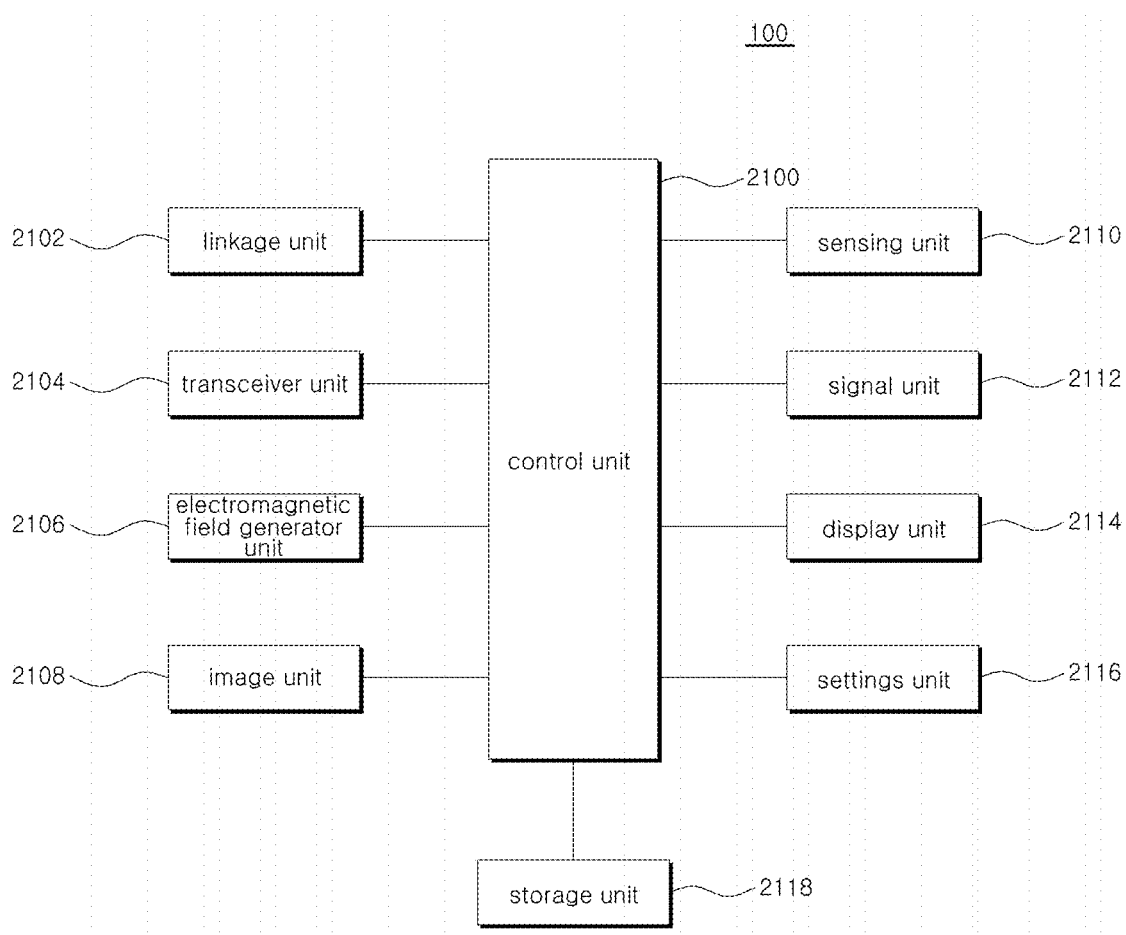
FIG. 21 is a block diagram illustrating the structure of a user terminal according to an embodiment.

FIG. 21 is a block diagram illustrating the structure of a user terminal according to an embodiment. FIG. 21 illustrates the structure of a user terminal 100 when the receiving terminal 102 is configured to transmit image data to the user terminal 100.

Referring to FIG. 21, the user terminal 100 of this embodiment can include a control unit 2100, a linkage unit 2102, a transceiver unit 2104, an image signal unit 2106, an image unit 2108, a sensing unit 2110, a signal unit 2112, a display unit 2114, a settings unit 2116, and a storage unit 2118.

In the following, descriptions of components that perform the same functions as described with respect to the earlier drawing figures are omitted.

The image signal unit 2106 may receive an image signal transmitted by way of the transceiver unit 2404 from the receiving terminal 102 and may analyze the received image signal.

The image unit 2108 may generate a first image 110 that corresponds to the image signal analyzed by the image signal unit 2106, or generate a combined image of the first image 110 and the second image 112.

The sensing unit 2110 may sense the position of the touch means.

The signal unit 2112 may create a control signal that includes information on the position of the touch means or a combination signal that includes combined image data. Also, the signal unit 2112 can transmit the image signal or the combination signal to the receiving terminal 102 through a data channel and transmit the control signal to the receiving terminal 102 through a control channel.

Figure 22:
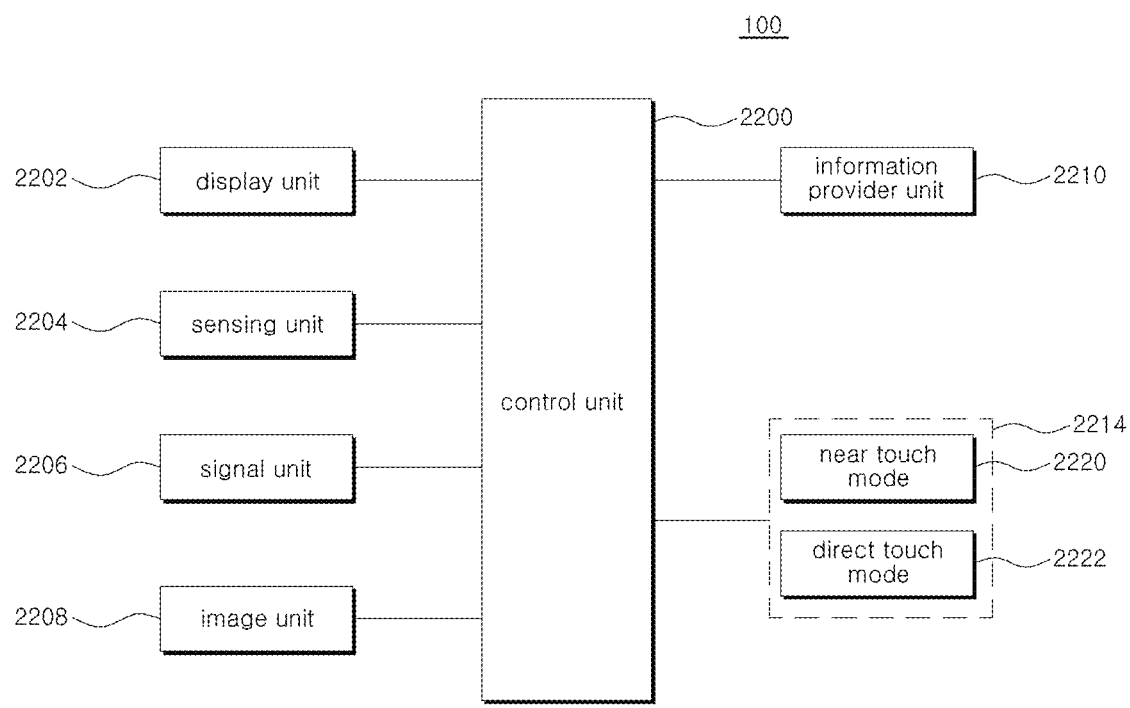
FIG. 22 is a block diagram illustrating the structure of a user terminal according to an embodiment.

FIG. 22 is a block diagram illustrating the structure of a user terminal according to an embodiment.

Referring to FIG. 22, the user terminal 100 of this embodiment can include a control unit 2200, a display unit 2202, a sensing unit 2204, a signal unit 2206, an image unit 2208, an information provider unit 2210, and a mode changer unit 2214. The user terminal 100 can include all or just some of the components above. Also, the user terminal 100 can additionally include components other than the components above.

The display unit 2202 may display a first image 110 that is shared by the user terminal 100 and the receiving terminal 102. Also, the display unit 2202 can display a menu, etc., from which to select a touch mode.

The sensing unit 2204 may sense the position of a touch means by way of various methods such as those described above, when the touch means is near or is touching the user terminal 100. Here, the position information representing the position of the touch means can be the position information of the touch means that is positioned within a preset distance from the user terminal 100.

The signal unit 2206 may transmit the position information of the touch means obtained by the sensing above to the receiving terminal 102 and may transmit image data corresponding to the first image 110 shared by the user terminal 100 and the receiving terminal 102 to the receiving terminal 102.

The image unit 2208 may generate combined image data that is to be shared by the user terminal 100 and the receiving terminal 102 or the second image 112 that indicates the position of the touch means.

The information provider unit 2210 can output information according to the sensing results of the sensing unit 2204. That is, nearness information can be outputted when a touch means is brought near the user terminal 100 and sensed by the sensing unit 2204. The nearness information can be in the form of vibration, sound, or light, so as to stimulate the user's tactile, auditory, or visual senses.

The information provider unit 2210 can provide the user with a tactile, auditory, or visual sensation in various types according to the state of nearness of the touch means with respect to the user terminal 100, to allow the user of the user terminal 100 to perceive various tactile, auditory, or visual sensations.

For example, with the user terminal 100 having recognized a near touch of the touch means, the information provider unit 2210 can provide a continuous vibration, sound, or light during a movement of the touch means. That is, a short vibration can be provided once when a near touch of the touch means is first recognized, after which continuous vibrations can be provided when the touch means moves. In other words, when a near touch of the touch means is first recognized, a vibration can be provided for a first duration, and afterwards when the touch means moves, a vibration can be provided for a second duration. Here, the second duration can be longer than the first duration.

Alternatively, the information provider unit 2210 can provide a vibration when a near touch is first recognized, and afterwards provide a sound when the touch means is moving.

In another example, the information provider unit 2210 can provide the user with nearness information in the form of sound, etc., when the touch means is brought near a preset object such as a folder, control user interface (UI), etc., from among the images shown on the screen of the user terminal 100. That is, as described above with reference to FIGS. 6A and 6B, the position image of the touch means can change when the touch means is placed at a preset position, and at this time, the information provider unit 2210 can output nearness information, where the nearness information can correspond to event occurrence information. In this way, the user can perceive the object immediately.

The information provider unit 2210 can provide the nearness information for a first duration when the sensing unit 2204 recognizes a nearness state of the touch means, and can provide the nearness information for a second duration when the touch means moves while the sensing unit 2204 is aware of the nearness state of the touch means. The second duration can be a duration corresponding to the duration for which the touch means moves while the sensing unit 2204 is aware of the nearness state of the touch means.

Also, the information provider unit 2210 can provide the nearness information in different forms for a first case, in which the sensing unit 2204 recognizes a nearness state of a touch means, and a second case, in which the touch means is moved while the sensing unit 2204 is aware of the nearness state of the touch means. As described above, a vibration can be provided for the first case and a sound can be provided for the second case, or vibrations of a first pattern can be provided for the first case and vibrations of a second pattern can be provided for the second case, so as to allow the user to perceive the movement of the touch means.

If the touch means touches the display unit 2202 after the sensing unit 2204 has recognized a nearness state, the information provider unit 2210 may not provide the nearness information, allowing the user of the user terminal to differentiate between a near state and a direct touch.

After the touch means has touched the display unit 2202, when the sensing unit 2204 recognizes a nearness state of the touch means for a second time, the information provider unit 2210 can provide the nearness information. Once the touch means is brought near the user terminal 100 and touches the user terminal 100, the touch means may be separated from the user terminal 100. That is, since the purpose of the touch has been fulfilled, the touch means may be separated from the user terminal 100 to proceed with the next operation, at which time a nearness state may occur again. In this case, since the touch means is put in a nearness state for the first time after touching the display unit 2202 and was not intentionally placed in a nearness state by the user, the information provider unit 2210 may be configured to not provide nearness information. Then, when a nearness state occurs for the second time, i.e. the user intentionally triggers a nearness state, the information provider unit 2210 can provide nearness information.

The mode changer unit 2214 may change the touch mode according to the user's input, where the touch mode can include a near touch mode 2220 and a direct touch mode 2222. Here, the user input can be made by way of a switch. The switch can be configured as a ring/vibration conversion switch.

In the near touch mode 2220, the position image of a nearby touch means can be displayed on the user terminal 100 or the receiving terminal. Also, the position image of a touch means touching the user terminal 100 with a pressure level or area smaller than or equal to a preset value can be displayed on the user terminal 100 or the receiving terminal. Also, as described above, the position image of a touch means can be displayed on the user terminal 100 or the receiving terminal 102 according to the user's request regardless of touch mode.

In the near touch mode, the user terminal 100 may recognize the position of a touch means that is near the user terminal 100 for a touch input of the touch means, and in the direct touch mode, the user terminal 100 may recognize a touch by the touch means as a touch input.

According to an embodiment, the mode changer unit 2214 can change the touch mode at the beginning of linked operation between the user terminal 100 and the receiving terminal 102 or change the touch mode according to the user's command, e.g. the user's touch, voice data, or visual data. For example, the user can change the touch mode by selecting on a menu shown on the user terminal 100, or the touch mode can be changed by the user's voice or a visual sequence such as motion.

The touch mode change function described above can be provided when the linked operation of the user terminal 100 and the receiving terminal 102 begins, or can be provided in the user terminal 100 regardless of linked operation. Also, the touch mode change function for linked operation can be provided automatically when the linked operation begins or can be provided after linking when the user selects the function. With a small screen as on a smart phone, it can be useful to sense a touch means that is nearby and show a corresponding image on the smart phone, and in such a device, it may be advantageous to provide the touch mode change function regardless of linked operation.

According to an embodiment, the user terminal 100 can be provided with a link mode in addition to the near touch mode and direct touch mode. For example, if a user carrying a user terminal 100 such as a smart phone or a tablet PC, etc., wishes to link it to a receiving terminal 102, the user can select the link mode. When the user selects the link mode, the user terminal 100 can search for display apparatuses close by, begin linking with a searched receiving terminal 102, and display a menu from which to select a near touch mode and a direct touch mode on the user terminal 100 at the beginning of the linked operation.

While it is not described above, the selection of the touch mode change can be achieved by methods other than selecting a menu displayed on the user terminal 100, such as by pressing a button provided on a side surface, a front surface, etc., of a smart phone.

The control unit 2200 may control the overall operations of the components of the user terminal 100.

Components in the embodiments described above can be easily understood from the perspective of processes. That is, each component can also be understood as an individual process. Likewise, processes in the embodiments described above can be easily understood from the perspective of components.

Also, the technical features described above can be implemented in the form of program instructions that may be performed using various computer means including processors and storage media and can be recorded in a computer-readable medium. Such a computer-readable medium can include program instructions, data files, data structures, etc., alone or in combination. The program instructions recorded on the medium can be designed and configured specifically for the present invention or can be a type of medium known to and used by the skilled person in the field of computer software. Examples of a non-transitory computer-readable recording medium may include magnetic media such as hard disks, floppy disks, magnetic tapes, etc., optical media such as CD-ROM's, DVD's, etc., magneto-optical media such as floptical disks, etc., and hardware devices such as ROM, RAM, flash memory, etc. Examples of the program of instructions may include not only machine language codes produced by a compiler but also high-level language codes that can be executed by a computer through the use of an interpreter, etc. The hardware mentioned above can be made to operate as one or more software modules that perform the actions of the embodiments of the invention, and vice versa.

The embodiments described above are disclosed only for illustrative purposes. A person having ordinary skill in the art would be able to make various modifications, alterations, and additions without departing from the spirit and scope of the invention, but it is to be appreciated that such modifications, alterations, and additions are encompassed by the scope of claims set forth below.

What is claimed is:

1. A method for sharing an image of a mobile terminal, the method comprising:

displaying a first image on the mobile terminal;

sensing a touch means when the touch means touches or is near a touch panel of the mobile terminal;

displaying a second image representing the touch means on the mobile terminal;

searching for a receiving terminal near the mobile terminal according to a link request from the mobile terminal and connecting the mobile terminal with the receiving terminal;

transmitting the first and second images to the receiving terminal linked with the mobile terminal; and controlling the mobile terminal by using the receiving terminal, wherein, when the receiving terminal receives the first image from the mobile terminal, the receiving terminal stops a broadcast program running in a current channel and displays the first image, wherein the first and second images are transmitted through a data channel between the mobile terminal and the receiving terminal, and a control signal for requesting or accepting linkage is exchanged through a control channel between the mobile terminal and the receiving terminal, wherein the mobile terminal modifies a region corresponding to a position of the touch means in the first image, creates a new image to indicate a position information of the touch means, and transmit the created image to the receiving terminal, wherein the position information of the touch means is coordinate information with respect to resolution and screen size of a display unit of the mobile terminal, wherein the receiving terminal having a display unit compares its resolution and screen size with the resolution and screen size of the mobile terminal and shows the image indicating the position of the touch means at coordinates corresponding to the position information of the touch means.

2. The method of claim 1,
wherein the display unit of the receiving terminal is larger than the display unit of the mobile terminal and the display unit of the mobile terminal is a capacitance-based touch panel.

3. The method of claim 2, wherein the first and second images are displayed over a content showing on the receiving terminal, and the second image is superimposed on the first image, wherein the second image is not displayed on the mobile terminal when the mobile terminal and the receiving terminal are in linked operation.

4. The method of claim 3, wherein a linkage server pre-stores the resolution and screen size information of the mobile terminal and receiving terminal and transmits image data corresponding to the first image to the mobile terminal and receiving terminal based on the stored information.

5. The method of claim 1, wherein the transmitting the first and second images comprises:
converting the first and second images according to properties of the receiving terminal; and
transmitting the converted first and second images to the receiving terminal.

6. The method of claim 5, wherein the converting the first and second images comprises:
converting a resolution of the first and second images.

7. The method of claim 1, wherein when the receiving terminal displays the first image received from the mobile terminal, the receiving terminal displays the first image together with the broadcast program simultaneously.

8. The method of claim 7, wherein when the receiving terminal displays the first image received from the mobile terminal, the receiving terminal superimposes the first image over the broadcast program, wherein when the receiving terminal receives the first image from the mobile terminal, the receiving terminal continues to run the broadcast program and displays the first image through a separate channel.

9. The method of claim 8, wherein a linkage server pre-stores the resolution and screen size information of the user mobile terminal and receiving terminal and transmits image data corresponding to the first image to the user mobile terminal and receiving terminal based on the stored information.

10. An image sharing method for a receiving terminal, the method comprising:
displaying a content on the receiving terminal;
receiving a first image from a user mobile terminal linked with the receiving terminal, a display unit of the receiving terminal is larger than a display unit of the user mobile terminal;
receiving a second image representing a position of a touch means touching a touch panel of the user mobile terminal or near to the touch panel of the mobile terminal; and displaying the first and second images over the content on the receiving terminal, wherein the user mobile terminal is controlled by using the display unit of the receiving terminal, wherein, when the receiving terminal receives the first image, the receiving terminal stops a broadcast content showing on a current channel of the receiving terminal and displays the first image, wherein the first and second images are transmitted during different data periods of a same channel between the user mobile terminal and the receiving terminal, wherein the user mobile terminal modifies a region corresponding to a position information of the touch means in the first image and creates the second image indicating the position of the touch means, and transmit the second image to the receiving terminal, wherein the position information of the touch means is coordinate information with respect to resolution and screen size of the display unit of the mobile terminal, wherein the receiving terminal compares its resolution and screen size with the resolution and screen size of the mobile terminal and shows the image indicating the position of the touch means at coordinates corresponding to the position information of the touch means.

11. The method of claim 10, wherein the second image representing the position of the touch means is superimposed on the first image, and the second image is not displayed on the user mobile terminal when the user mobile terminal and the receiving terminal are in linked operation.

12. The method of claim 10, wherein the displaying the first and second images comprises:
converting the first and second images according to properties of the receiving terminal; and
transmitting the converted first and second images to the receiving terminal,
wherein the converting the first and second images comprises:
converting a resolution of the first and second images.

13. The method of claim 12, wherein a linkage server pre-stores the resolution and screen size information of the user mobile terminal and receiving terminal and transmits image data corresponding to the first image to the user mobile terminal and receiving terminal based on the stored information.

14. The method of claim 10, wherein the second image is not displayed on the receiving terminal according to a user request.

15. The method of claim 10, wherein the first and second images are transmitted to the receiving terminal through a dongle.

16. The method of claim 15, wherein the dongle converts the first and second images and transmits the converted first and second images to the receiving terminal.

17. An image sharing method for a user mobile terminal, the method comprising:
displaying a first image on the user mobile terminal;
sensing a touch means touching a capacitance-based touch panel of the user mobile terminal or the touch means near the capacitance-based touch panel of the user mobile terminal;
displaying a second image representing a position of the touch means;
searching for a dongle near the user mobile terminal according to a link request of a user and linking with the dongle;

transmitting the first and second images to the dongle linked with both the user terminal and a receiving terminal; and controlling the user mobile terminal while viewing the receiving terminal, wherein a display unit of the receiving terminal is larger than a display unit of the user mobile terminal, wherein the first and second images are transmitted to the receiving terminal through the dongle and displayed over a content showing on the receiving terminal, wherein, when the receiving terminal receives the first image, the receiving terminal stops a broadcast content showing in a current channel of the receiving terminal and displays the first image, wherein the first and second images are transmitted through a data channel between the user mobile terminal and the receiving terminal, and a control signal for requesting or accepting linkage is exchanged through a control channel between the user mobile terminal and the receiving terminal, wherein the user mobile terminal modifies a region corresponding to a position information of the touch means in the first image and creates the second image indicating the position of the touch means, wherein the position information of the touch means is coordinate information with respect to resolution and screen size of the display unit of the mobile terminal, wherein the receiving terminal compares its resolution and screen size with the resolution and screen size of the mobile terminal and shows the image indicating the position of the touch means at the coordinates corresponding to the position information of the touch means.

18. The method of claim 17, wherein the dongle converts the first and second images and transmits the converted first and second images to the receiving terminal.

19. The method of claim 17, wherein the second image is superimposed on the first image, and the second image is not displayed on the user mobile terminal when the user mobile terminal and the receiving terminal are in linked operation.

20. The method of claim 17, wherein when the receiving terminal displays the first image, the receiving terminal continues to run the broadcast content and displays the first image through a separate channel.

* * * * *